United States Patent [19]

Simpson et al.

[11] Patent Number: 5,142,534
[45] Date of Patent: Aug. 25, 1992

[54] WIRELESS INTEGRATED VOICE-DATA COMMUNICATION SYSTEM

[75] Inventors: Raymond W. Simpson, Hamilton Square, N.J.; Richard J. Zaffino, Newtown, Pa.; Adrian A. Giuliani, Aberdeen; Sorin Davidovici, North Brunswick, both of N.J.

[73] Assignee: O'Neill Communications, Inc., Princeton, N.J.

[21] Appl. No.: 599,673

[22] Filed: Oct. 17, 1999

[51] Int. Cl.⁵ .............................. H04J 3/16
[52] U.S. Cl. .................... 370/95.100; 370/50
[58] Field of Search ............. 370/50, 95.1, 70, 95.3; 375/1

[56] References Cited

U.S. PATENT DOCUMENTS

| | | | |
|---|---|---|---|
| 4,222,115 | 9/1980 | Cooper et al. | 370/92 |
| 4,355,399 | 10/1982 | Timor | 370/93 |
| 4,479,226 | 10/1984 | Prabhu et al. | 375/43 |
| 4,672,658 | 6/1987 | Kavehrad et al. | 379/63 |
| 4,750,036 | 6/1988 | Martinez | 358/147 |
| 4,850,036 | 7/1989 | Smith | 455/179 |
| 4,866,710 | 9/1989 | Schaeffer | 370/50 |

OTHER PUBLICATIONS

"Proceedings of the IEEE", Apr. 1987 article entitled *Universal Digital Portable Radio Communications*, pp. 436–477.

Primary Examiner—Douglas W. Olms
Assistant Examiner—Wellington Chin
Attorney, Agent, or Firm—Mathews, Woodbridge & Collins

[57] ABSTRACT

A digital voice-data communication system having a base network control unit coupled to a plurality of fixed transceivers for providing communications to a plurality of portable sets. The base network control unit includes control means for permitting communication between the portable sets within the system, or between the portable sets and a larger external telecommunications network. The system employs frequency hopping, time division multiplexing and demand assigned multiple accessing to permit economy of fixed resources via multiple voice channels for each fixed station transceiver and relatively simple portable sets which may be hand held.

20 Claims, 13 Drawing Sheets

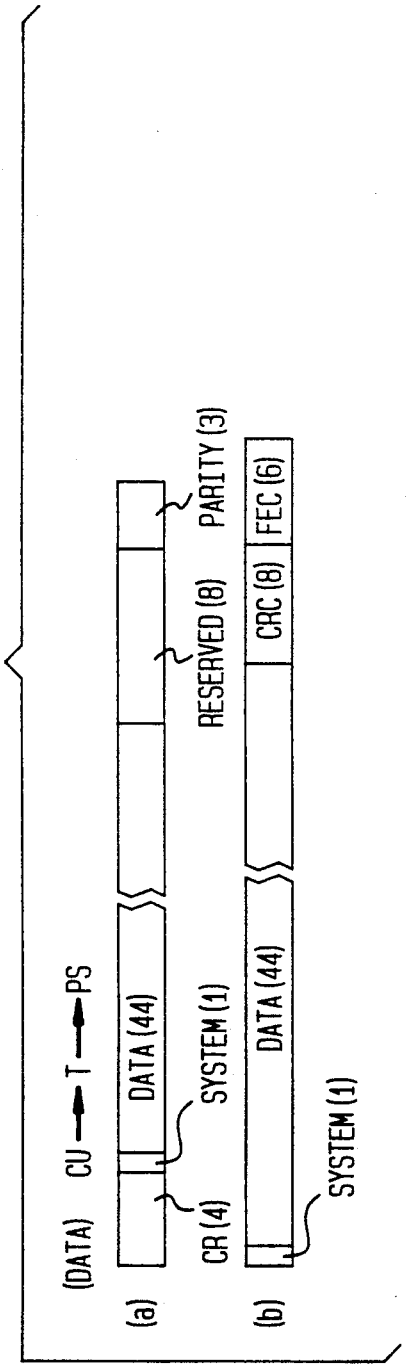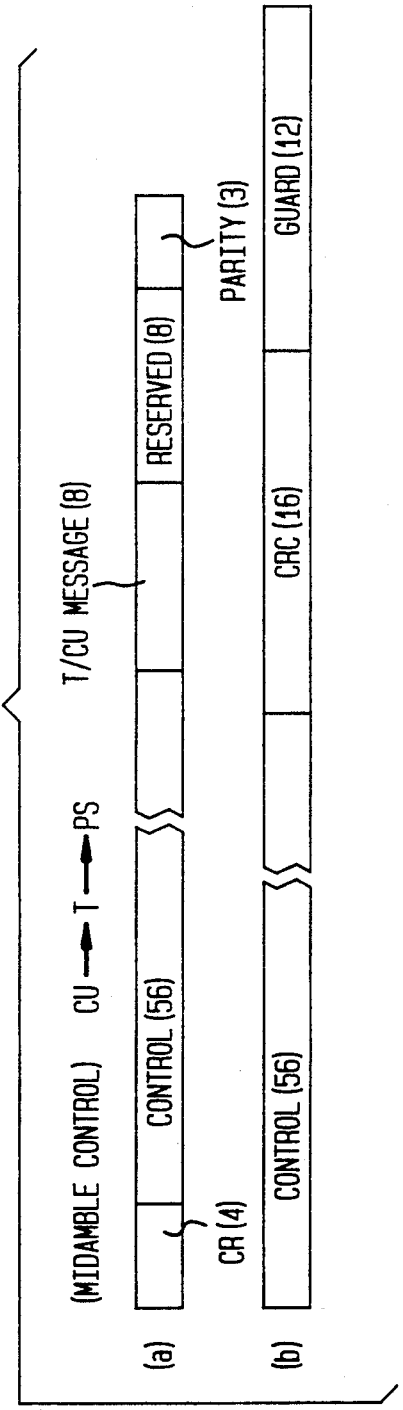

WIRELESS INTEGRATED VOICE-DATA COMMUNICATION SYSTEM

BACKGROUND

1. Field of the Invention

The present invention relates to wireless communication systems and, more particularly, to a digital, cellular or microcellular radio system capable of providing voice and data communications to users via portable equipment.

2. Description of the Prior Art

In the field of radio communication, there has been an increasing demand for portable communication systems. Responsive to this demand, a variety of portable systems have been developed, such as cordless telephones, mobile radio telephones and radio paging systems. Although such devices have served the purpose, they have not proved entirely satisfactory under all conditions of service for a variety of reasons. For example, most portable systems are designed to only operate efficiently in a spectrum free of interfering signals. Consequently, the user or provider of such systems must apply to a governmental authority for allocation of an operating frequency, a process that is usually protracted. Also, for frequencies below 3 GHz, the spectrum is virtually fully allocated in most regions of the world. Since frequency allocations are generally made on a nation-by-nation basis, the allocation process is even more complex and protracted for those wishing to provide universal portable communication systems.

Another drawback of prior art portable systems is their lack of privacy. Most existing systems employ analog signal transmissions, making them vulnerable to easy eavesdropping with the use of scanners. Such analog systems are also subject to problems with false usage, accidental dialing, and the like.

To obviate the privacy problems, digital portable communication systems have been proposed. However, most digital systems are narrow band and must employ complicated voice coding techniques to reduce the bandwidth of the transmitted voice signal. These techniques normally increase the transmit delay which leads to a need for echo cancelling and reduces perceived audio quality.

A further disadvantage of conventional cellular systems is their hand off procedures, which are usually complicated to administer and often fail, leading to a loss of calls in progress. Even when working properly, most cellular systems have a noticeable gap in communications during hand off.

Although there has been a long recognized need for an economical, simple and efficient wireless integrated voice-data communication system capable of dependable operation in the presence of interfering signals, no practical system for doing so has yet been devised. Ideally, such a system would provide quality operation even in the presence of interfering signals; would economically employ fixed communication resources; would include mobile units that are relatively simple in construction and operation; would provide a high degree of security, preventing such problems as eavesdropping, false usage, accidental dialing and the like; would operate with low transmit delay to prevent signal degradation and reduced audio quality due to echo effects from signal reflections; would provide hand off which is not audible to the user; would allow operation as a data transmission system as well as a voice system; and would degrade gracefully in the presence of interference. The present invention fulfills this need.

SUMMARY OF THE INVENTION

The general purpose of this invention is to provide a wireless communication system which embraces all of the advantages of similarly employed systems and possesses none of the aforedescribed disadvantages. To attain this, the present invention contemplates a unique digital voice-data communication system having a base network control unit coupled to a plurality of fixed transceivers for providing communication to a plurality of portable sets. The base network control unit includes control means for permitting communication between the portable sets within the system, or between the portable sets and a larger external telecommunications network. The present invention utilizes spread spectrum technology in the form of frequency hopping (FH) to permit operation in the presence of interfering signals and to obtain a high degree of privacy.

The system employs time division multiplexing (TDM) and demand assigned multiple accessing (DAMA). This combination, in addition to providing robustness in the presence of interfering signals, permits economy of fixed resources via multiple voice channels for each fixed station transceiver and relatively simple portable sets which may be hand held.

The system is designed to allow the same over-the-air signalling and timing to be used in a non-cellular version as is needed for a full on-site cellular system. The non-cellular voice system protocols may be, in essence, a subset of the on-site cellular protocols. The portable sets may be changed from a non-cellular configuration to an on-site cellular unit by receiving down-loaded software over the radio link. Similarly, different feature sets and privileges are provided via down-loaded software so a user might, for instance, be authorized to receive calls from the on-site cellular system but not be authorized to initiate outgoing calls via the on-site cellular system.

The exact nature of this invention as well as other features and advantages thereof will be readily apparent to those skilled in these arts from consideration of the following specification relating to the annexed drawings.

BRIEF DESCRIPTION OF THE DRAWINGS

FIGS. 4–11 are graphs representing various signals generated throughout the system useful in understanding the system operation.

DETAILED DESCRIPTION OF THE PREFERRED EMBODIMENT

Figure 1:
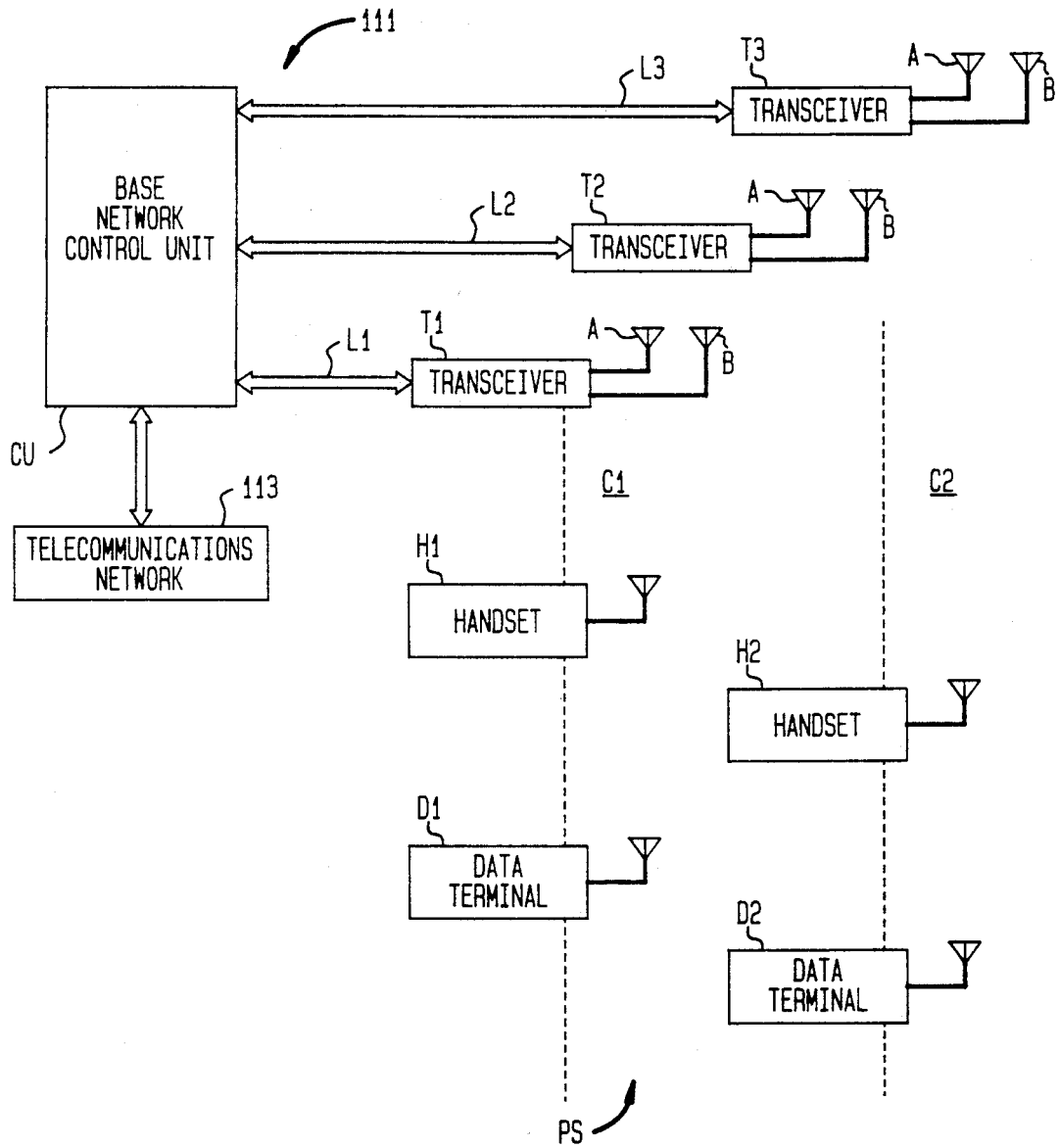
FIG. 1 is a generalized block diagram illustrating a preferred embodiment of the invention.

Referring now to the drawings, there is shown in FIG. 1 a radio communication system 111 for providing portable communications to users via a plurality of portable sets PS, such as handsets H1, H2 and data terminals D1, D2. The system 111 includes a base network control unit CU and a plurality of radio transceivers T1, T2, T3. The base network control unit CU includes circuitry that acts as a system controller and an interface for coupling system 111 to an external telecommunication network 113, such as a public telephone network, a private branch exchange (PBX), or the like. When system 111 is installed in a large office building, the control unit CU may be installed in a typical telephone closet. However, as will become clear below to those skilled in these arts, a distributed system of computers and intelligent controllers could be employed to implement most of the base network control unit CU.

The transceivers T1, T2, T3, located at various points throughout an area to be serviced (office building), are each connected to the control unit CU via a plurality of transmission lines L1, L2, L3. The transceivers T1, T2, T3 are distributed throughout the area (building) so as to form a plurality of radio ports that transmit and receive radio signals over spaced regions called cells.

Depending on the characteristics of the installation, the complexity of the radio propagation environment may be substantial. In a typical office building, the shortest direct path between any pair of port and portable set locations is often blocked by walls, ceilings, or other objects. Often many different attenuated propagation paths exist between any pair of locations. The different paths are produced by reflections from walls, ceilings, and objects. Each path may have a different length and a different attenuation. The overall result is a complex and widely varying multipath transmission channel between ports (transceivers T1-T3) and portable sets PS (handsets H1, H2 and data terminals D1, D2).

For purposes of illustration, the serviced area, as shown in FIG. 1, is divided into cells C1 and C2 with two transceivers T1, T2 co-located in cell C1 and one transceiver T3 located in cell C2. As will be described later in detail, the system 111 may selectively establish transmission between any port and any portable set PS. However, the system 111 is also capable of establishing a communication by choosing the radio port providing the best radio reception, normally the transceiver T1-T3 that is located in the same cell C1, C2 as the portable set PS. For example, while handset H1 may be physically capable of having radio transmission of a reasonable quality with any one of the transceivers T1-T3, the system 111 will try to establish transmission between a transceiver T having reception of a quality greater than some predetermined standard. If this goal is not achievable then the transceiver T having the best reception regardless of its cell C1, C2 is used providing it is not below a predetermined standard, in which case the system 111 would cease communication with the portable set PS involved. The system 111 also provides automatic "hand off", e.g. as the handset H1 moves from cell to cell, the system 111 will detect such movement via the quality of reception and establish communication between H1 and the other radio ports located in the other available cells C1, C2 to maintain high quality reception. It is also perceived that in some cells C1, C2 two or more transceivers T may be co-located (e.g. in FIG. 1 transceivers T1, T2 are co-located in cell C1) to provide additional transmission links in a given cell C1, C2. As such, the system 111 may select either transceiver T1 or T2 for use by hand set H1. Additionally, the system 111 may also provide handoff of a portable set PS between co-located transceivers, e.g. handoff of hand set H1 from transceiver T1 to transceiver T2 which are both located in cell C1. Further, it is perceived that when all radio ports in a first cell, say cell C1, are overloaded, a radio port in a second cell, say cell C2, may be used to service portable sets PS in the first cell C1.

In a small system, blanket communication is also available. In this mode of operation all radio ports, i.e. transceivers T1-T3, will transmit and receive the same signals simultaneously. The system 111 will first process all received signals to determine which signal has the highest quality and will then pass only the higher quality signal for further processing.

The system 111 employs digital radio transmission using frequency hopping (FH) with time division multiplexing (TDM) and demand assigned multiple access (DAMA). As such, the system 111 may operate effectively in a relatively hostile propagation environment and in the presence of noise and interference. System 111 may be designed to operate within the expected Federal Communication Commission (FCC) parameters governing spread spectrum operation in the 2.4–2.4835 GHz band. As such, the preferred embodiment described herein has been illustrated using the 2.4–2.4835 GHz band as an example. It is understood, of course, that the principles of the present invention have broader applications.

Figure 2:
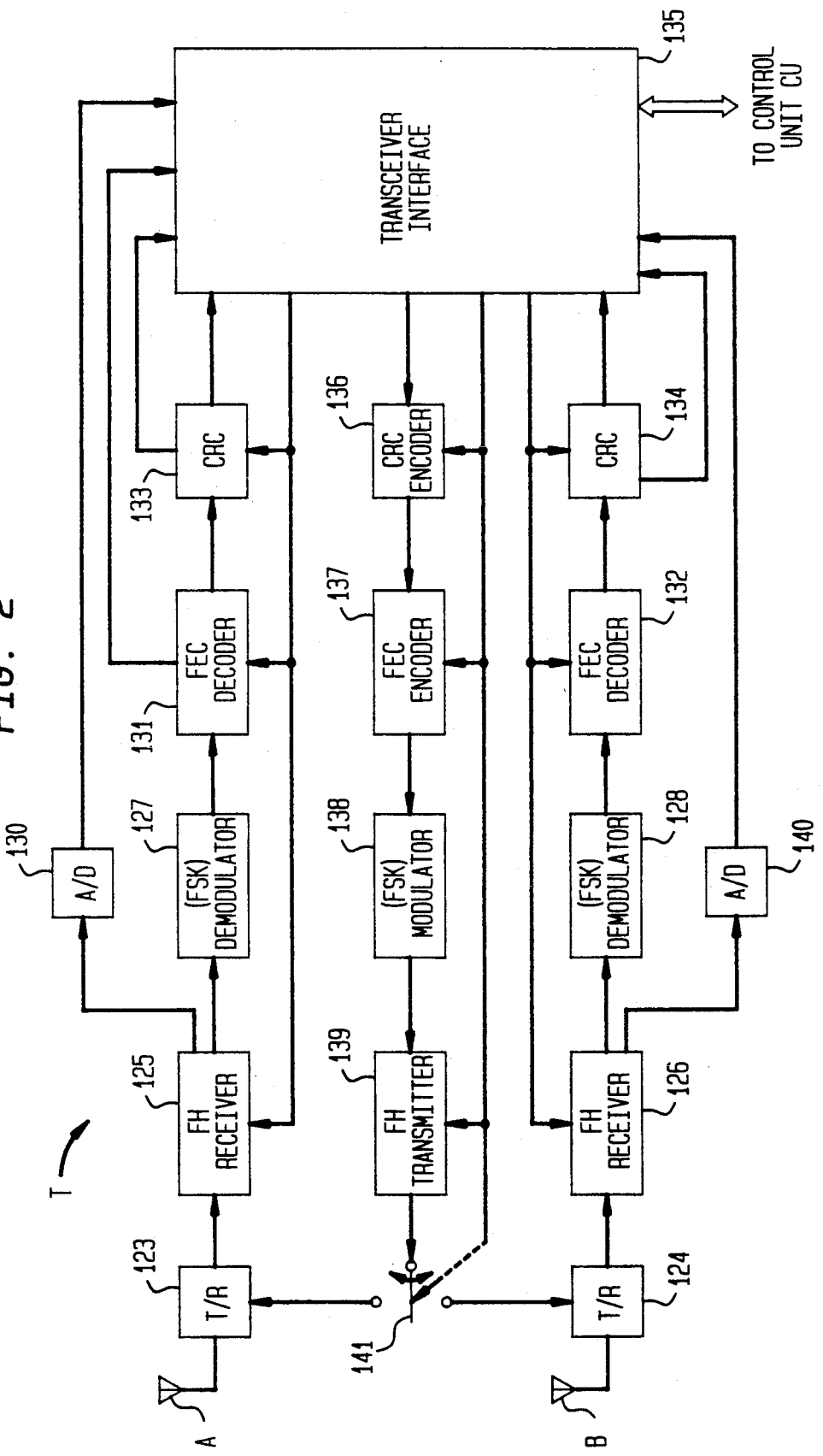
FIG. 2 is a detailed block diagram of a portion of the system shown in FIG. 1 illustrating the transceiver.

FIG. 2 shows a block diagram of a typical transceiver T. To provide antenna diversity, transceiver T includes two spaced antennas (A), (B) connected to transmit-receive (T/R) switches 123, 124, respectively. T/R switches 123, 124 are connected to two parallel receiver channels, each having a frequency hopping (FH) receiver 125, 126, a frequency shift keying (FSK) demodulator 127, 128, a forward error correcting (FEC) decoder 131, 132 and a cyclic redundancy checker (CRC) 133, 134 that are connected to a transceiver interface 135. FSK is used for illustration and is preferred for economy of implementation. However, it will be appreciated by those skilled in these arts that other modulation schemes can provide higher performance at a greater complexity. Examples include the following: binary phase shift keying (BPSK); quadrature phase shift keying (QPSK); offset keyed quadrature phase shift keying (OKQPSK); continuous phase frequency shift keying (CPFSK); etc.

Also connected to interface 135 is a transmitter channel including a cyclic redundancy check (CRC) encoder 136, an FEC encoder 137, an (FSK) modulator 138, an FH transmitter 139 and a switch 141 for selectively connecting the output of transmitter 139 to either one of the two antennas (A), (B) via T/R switches 123, 124, under the control of interface 135. Analog-to-digital (A/D) encoders 130, 140 are connected to the FH receivers 125, 126, respectively, for quantizing the signal strength of the receivers and transmitting a digital code to interface 135 indicative of signal strength.

Figure 3:
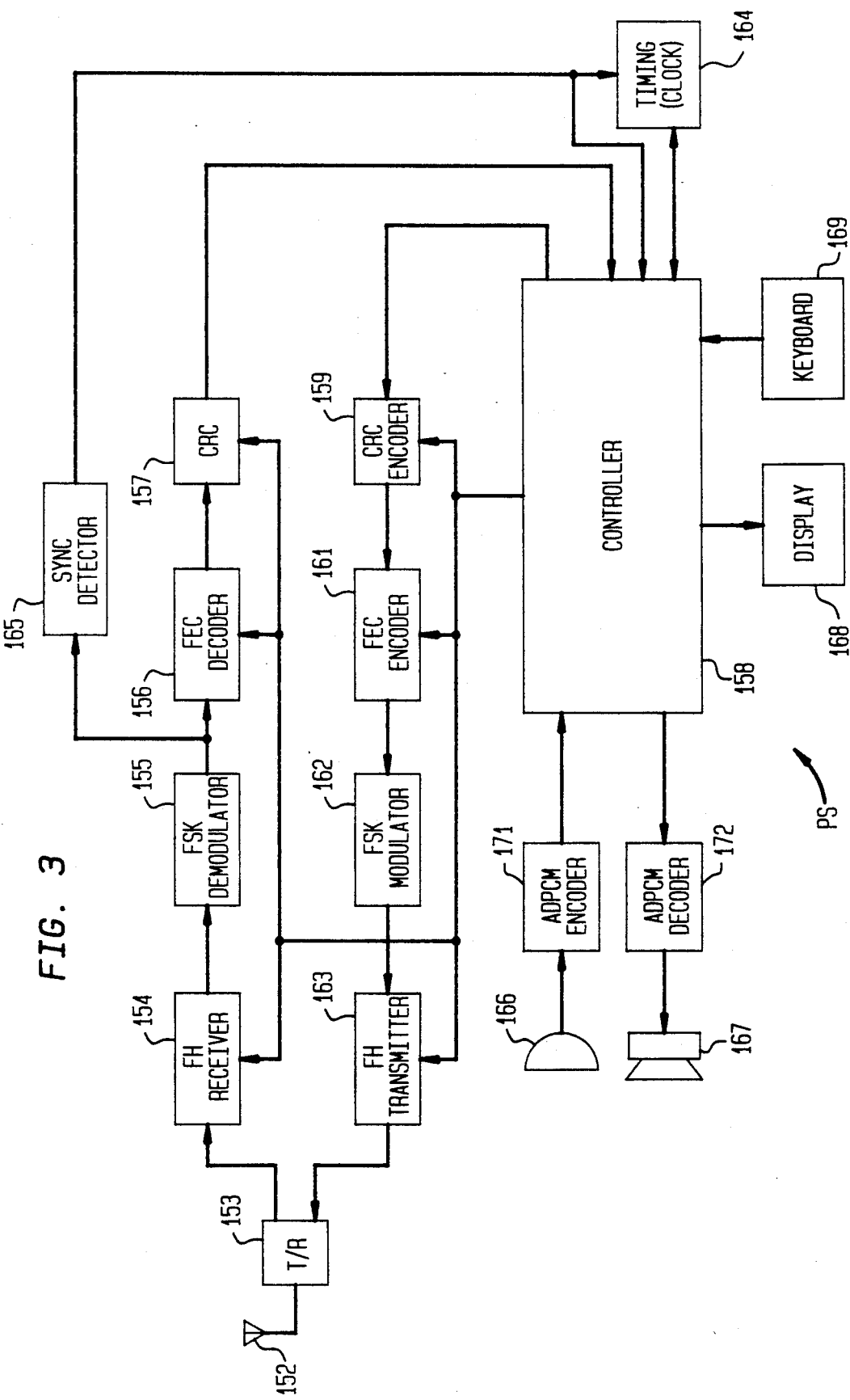
FIG. 3 is a detailed block diagram of a portion of the system shown in FIG. 1 illustrating the details of a portable set.

FIG. 3 shows a block diagram of a typical portable set PS. The portable sets PS each include an antenna 152 connected to an FH receiver 154 via a T/R switch 153. The output of FH receiver 154 is connected to an (FSK) demodulator 155 which in turn is connected to FEC decoder 156. A CRC 157 is connected to the output of FEC decoder 156. The output of CRC 157 is fed to controller 158 which has an output connected to a CRC encoder 159. The output of CRC encoder 159 is connected to an FEC encoder 161 which in turn is connected to (FSK) modulator 162. An FH transmitter 163 is connected to (FSK) modulator 162 and to T/R switch 153. A timing clock 164 is connected between a synchronization detector 165 and controller 158.

Coupled to the controller 158 are appropriate input and output communication devices such as a microphone 166, a loudspeaker 167, a display 168 and a keyboard 169. Microphone 166 is coupled to controller 158 via an analog-to-digital pulse code modulator encoder 171 using adaptive differential pulse code modulation (ADPCM) in the preferred embodiment. It is clear to those skilled in the art that as voice coding technology advances, ADPCM could advantageously be replaced with a more advanced speech coding technique. This would allow realization of more channels with the same hardware by using speech slots on a time shared basis. For instance, ADPCM often operates in commercial systems at 32 kb/s for high quality speech. If a more advanced speech coding technique, such as residual excited linear predictive filtering (RELP) coding became economical, as is expected in the near future, providing high quality speech at 16 kb/s, then two portable sets PS could share a slot assignment by transmitting on alternate hops, thus doubling the number of available channels.

Speaker 167 has an (ADPCM) decoder 172 coupling it to controller 158. Timing signals are transmitted from an output of controller 158 to receiver 154, transmitter 163, FEC decoder 156, CRC 157 and encoders 159, 161. These timing signals are based on the timing (clock 164) output.

FIGS. 4–11 illustrate signals useful in understanding the operation of transceiver T and portable sets PS. For purposes of illustration only, it is assumed that transceiver T is capable of communicating with up to six portable sets PS such as hand sets H1, H2 and data terminals D1, D2. To create an illustrative example in the present description, it is further assumed that communication is taking place in the 2.4–2.4835 GHz band and that seventy-seven frequencies, approximately equally spaced across the band, are used in a pseudo-random order for frequency hopping. The index "$k$" is used to identify the seventy-seven frequencies in their natural order while the index "$n$" is used to identify the same seventy-seven frequencies but in the pseudo-random order.

Figure 11:
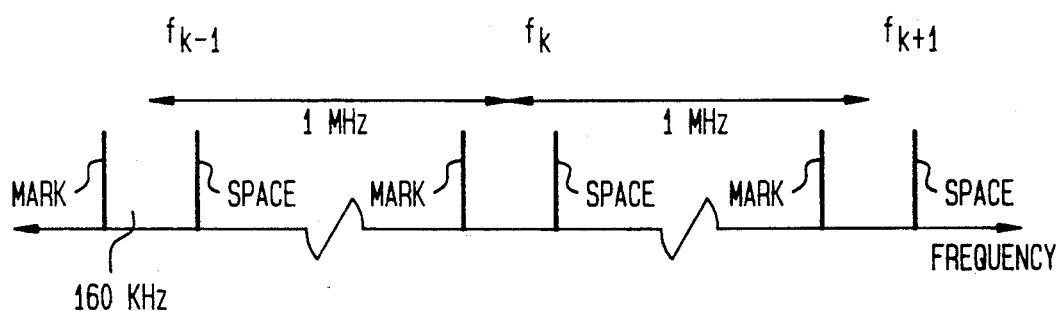

FIG. 11 illustrates the FSK modulation employed by the system 111. In the FIG. 11 diagram, three equally spaced frequencies are shown in their natural order by dashed vertical lines located at $f_{k-1}$, $f_k$ and $f_{k+1}$. In terms of the frequency band mentioned above (2.4–2.4835 GHz), the equally spaced frequencies $f_k$ would typically be separated by about one megahertz. A pair of frequencies spaced by about 160 kilohertz on either side of a frequency $f_k$ are used to designate either the mark or space to produce a conventional FSK binary signal.

Figure 4:
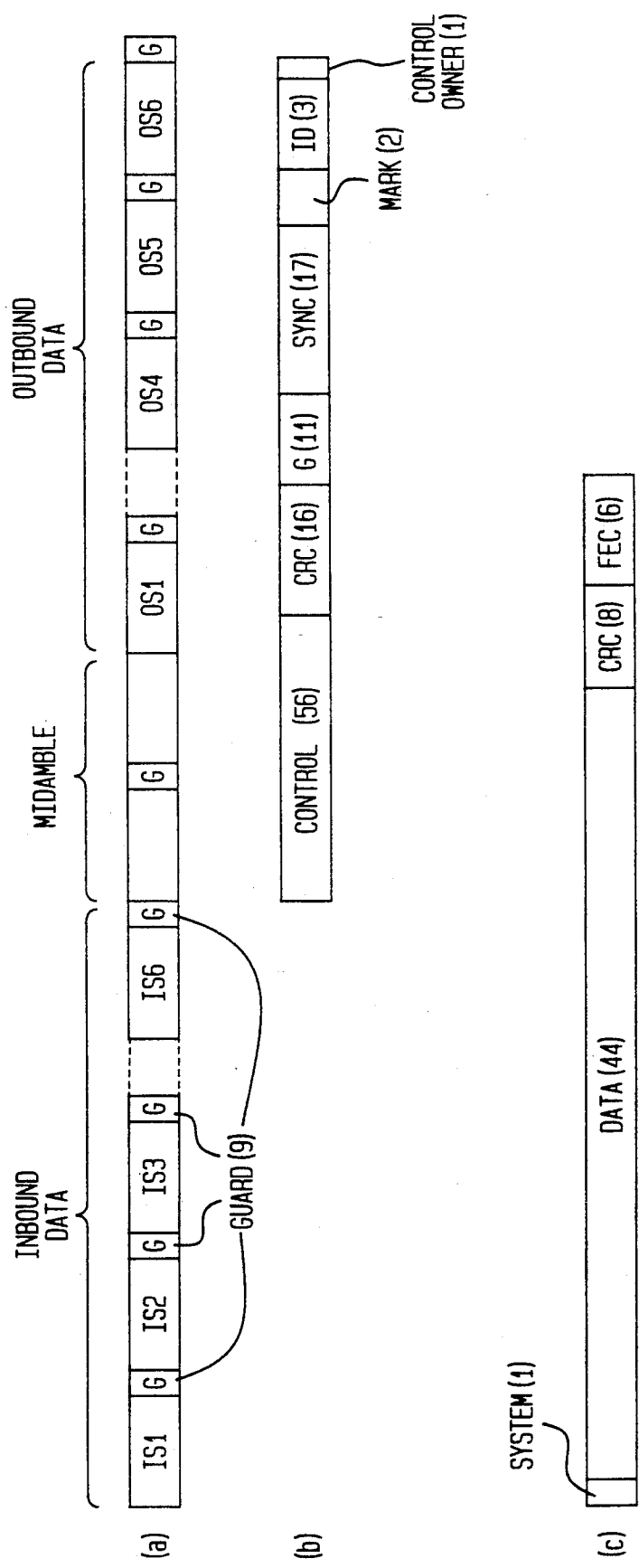
Figure 5:
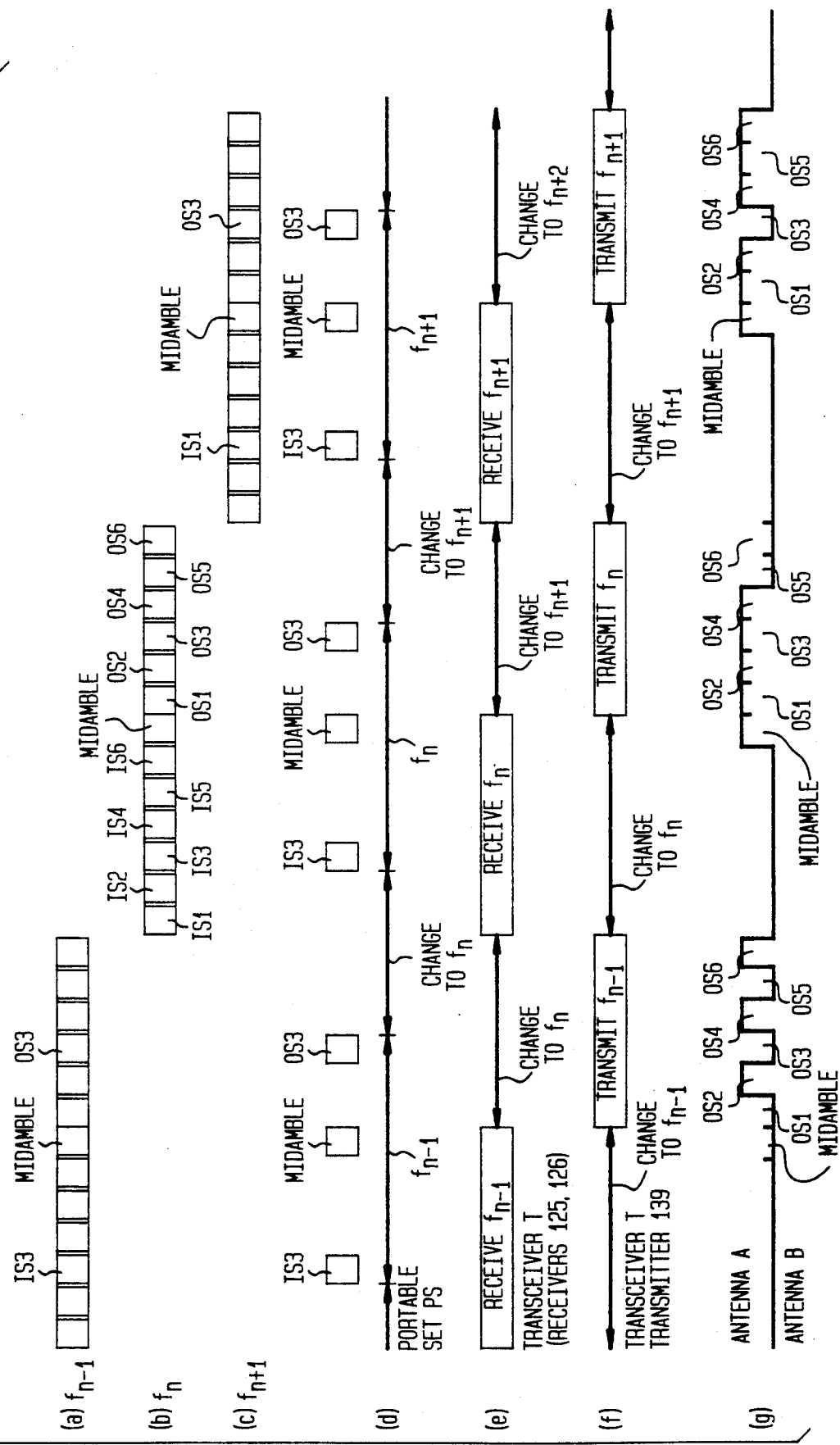

The diagrams of FIGS. 4–10 are signals that illustrate a typical timing and bit assignments used for communication and control in the system 111. A description of each of the time periods and bit segments shown in FIGS. 4–10 follows, it being understood that the specific bit assignments, code lengths, etc. used herein are merely examples used to simplify the description while illustrating a workable embodiment:

HOP—A period of time spanning 880 bit times during which energy is transmitted in a fixed frequency band centered at $f_k$ where $k$ goes from one to seventy-seven. Signal (a) of FIG. 4 shows a period having 880 bit times for a single HOP. FIG. 5, signals (a)–(c), show three successive HOPS at frequencies $f_{n-1}$, $f_n$, $f_{n+1}$, each HOP having 880 bit times.

INBOUND DATA—Data being transmitted from up to six portable sets PS to each transceiver T during the first 408 bit times of a HOP (FIG. 4, signal (a)).

OUTBOUND DATA—Data being transmitted from a transceiver T to up to six portable sets PS during the last 366 bit times of a HOP (FIG. 4, signal (a)).

MIDAMBLE—Bit strings transmitted during the 106 bit times between the INBOUND DATA and the OUTBOUND DATA (FIG. 4, signal (b)).

INBOUND SLOTS IS1–IS6—Six 59-bit segments (FIG. 4, signal (c)) separated by GUARD times each being nine bit times long. INBOUND DATA is transmitted by the six portable sets PS during a different one of the six slots IS1–IS6.

OUTBOUND SLOTS OS1–OS6—Six 59-bit segments (identical in format to slot IS1 in FIG. 4, signal (c)) separated by GUARD times each being one bit-time long. OUTBOUND DATA is transmitted by a transceiver T to six portable sets PS in six successive slots OS1–OS6 such that DATA in each slot is intended for reception by a different one of the six sets PS.

CONTROL—A 56-bit segment used by the control unit CU and a transceiver T or a set PS to send a control signal. For example, the portable sets PS may be equipped with a "do not disturb" button which, when depressed by a user, will generate a unique code that is inserted into the CONTROL segment to indicate that calls directed to that particular set PS should not be transmitted. Also, the CONTROL segment can carry registration signals generated by a set PS that inform the unit CU that the particular set PS is turned on and is available to receive calls.

CRC—A string of bits placed at the end of a bit stream by CRC encoders 136, 157 and used for redundancy check by CRC 133, 134, 159 for error checking.

SYNC—A fixed 17-bit pattern transmitted during each HOP by the transceivers T for use by the sets PS in acquiring synchronization.

MARK—A 2-bit code that is transmitted by the transceivers T for use by the sets PS. The MARK code will indicate where in the frequency hopping sequence the particular transmitter is located. For example, transceiver T may transmit a MARK code, say 00, during each HOP for the first fifteen frequencies $f_k$ in the pseudo-random sequence and then change to another MARK code, say 01, for transmission during the second fifteen hopping frequencies $f_k$, and so forth. The sets PS will use these changes in the MARK code (e.g. from 00 to 01) to locate one of six specific points in the set of frequencies for use in tuning the hopping circuit of set PS into calibration agreement with that of the transceiver T.

ID—A 3-bit code transmitted by the transceivers T during each HOP for identification of the system 111. A set PS would check the system 111 identification to insure it is in communication with an appropriate system. The complete system identification may be embodied in a plurality of successive ID codes. For example, system identification may be coded into eighteen bits that are transmitted three at a time during six successive HOPS, after which the same identification code is repeated in the next six HOPS, and so forth.

SYSTEM—A single bit used before each set of DATA bits to indicate whether the DATA bits represent user data (data to be used for communication of information by a user) or system data (data that is used by the system 111).

DATA—The digital data that normally represents the information being transmitted to or from the user. The system 111 encodes the user information into strings of forty-four bits. Also, various components of the system 111 may also generate 44-bit strings of system data for transmission as DATA.

FEC—A forward error correcting 6-bit code added to DATA and CRC to be used for performing single-error corrections of transmitted DATA.

ERR—A 2-bit code generated by a transceiver T to indicate the nature of the signals received via antennas (A), (B). The system 111 may use the following codes: 00—no errors in received signal; 01—one bit in error and corrected by FEC; 1X—more than a one bit error, DATA was not corrected. Two ERR codes are used, one for each antenna (A), (B).

SIGNAL STRENGTH—A 4-bit code generated by A/D 130, 140 to indicate the strength of the signals received via antennas (A), (B), respectively. Using the 4-bit code, the strength may be quantizied up to sixteen different levels by A/D 130, 140.

GUARD—One or more bit times during which no data is transmitted. GUARDS of various lengths are placed at specific locations to provide dead time periods that separate bit streams usually to prevent improper communications when the circuits are in transition.

RESERVED—One or more bit times having no present assignment but reserved for future assignment.

PARITY—Bits appended to a string for redundancy check.

Figure 7:
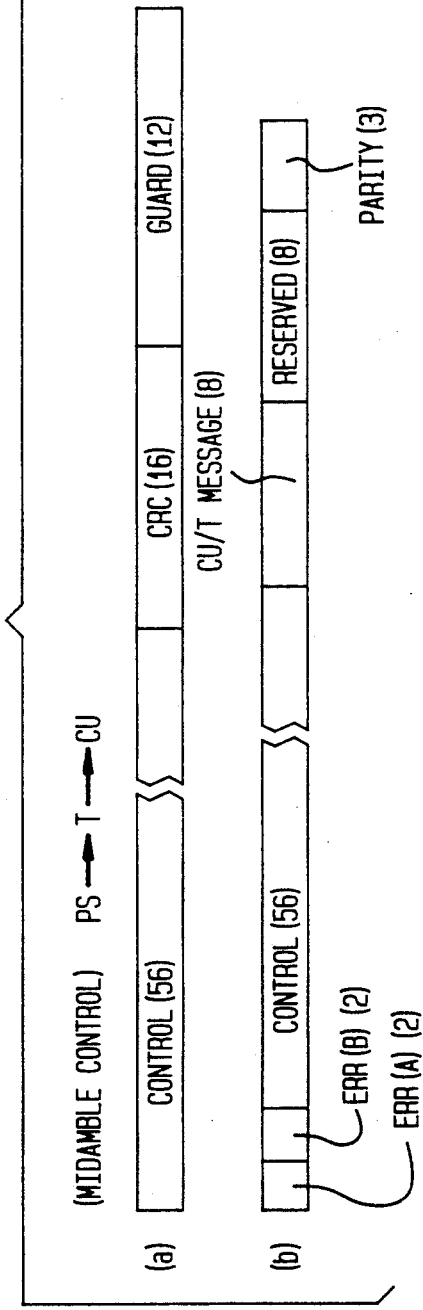

CU/T MESSAGE—An 8-bit field used by a transceiver T to send a message to the control unit CU (FIG. 7). Also a T/CU MESSAGE is an 8-bit field used by the CU to send an 8-bit message to transceiver T (FIG. 9). Control by unit CU of the hopping sequence for a transceiver T may be accomplished via the CU/T MESSAGE field. Additionally, a "shut down" or "start up" signal may be transmitted from the unit CU to transceiver T via the CU/T MESSAGE field to turn transceivers T on and off.

CR—A 4-bit string used by the control unit CU to control the transceiver T.

CONTROL OWNER—A bit used by the unit CU to tell the transceivers T and portable sets PS that on the next HOP the unit CU will use the CONTROL portion of the MIDAMBLE to send a control signal. When the unit CU indicates, via CONTROL OWNER, that it will not use the CONTROL portion of the MIDAMBLE on the next HOP, then the CONTROL portion is free to be captured and used by any of the sets PS.

FIG. 5 illustrates system timing for three consecutive frequency HOPS $f_{n-1}$, $f_n$ and $f_{n+1}$. It is noted that the number of frequencies used should preferably be large enough so as to effectively spread the energy over the entire band. Currently, the FCC requires that at least seventy-five frequencies be used for FH systems operating in the 2.4–2.4835 GHz band. For the current system, it is preferred that seventy-seven frequencies be employed for the following reasons:

(a) There exist specific hopping patterns for 77 frequencies which have advantages in suppressing interactions which arise among transceivers T as a result of non-ideal properties of their components.

(b) Seventy-seven is the product of 11 and 7, two prime numbers. Therefore, when slot sharing is used, the pattern of frequencies used by any set PS remains pseudo-random for slot sharing multiples of integers other than 7 and 11. This is desirable to keep effects of interfering signals pseudo-random, thus minimizing the audible effect of silence substitution.

(c) Seventy-seven has more hops than 75, and is near the maximum number which can be accommodated in the allotted frequency band with adequate guard bands to prevent out-of-band emissions.

FIG. 5, signals (a)-(c), illustrate three consecutive HOPS with each HOP consisting of six INBOUND SLOTS IS1-IS6, a MIDAMBLE and six OUTBOUND SLOTS OS1-OS6. FIG. 5, signal (d) illustrates timing provided by controller 158 for a portable set PS that has been assigned the third slot for communication with a transceiver T. The portable set PS, which may be either a hand set H1, H2 or a data terminal D1, D2, transmits a 59-bit stream (FIG. 4, signal (c)) at frequency $f_{n-1}$ during the INBOUND SLOT IS3 (FIG. 5, signal (d)). During the time period indicated by the first MIDAMBLE in FIG. 5, the portable set PS will (as will all sets PS) receive the MIDAMBLE at frequency $f_{n-1}$ (FIG. 4, signal (b)). During the time period indicated by the first OUTBOUND SLOT OS3 in FIG. 5, the portable set PS will receive a bit stream comparable to that shown in FIG. 4, signal (c) that was transmitted by transceiver T. After receiving during slot OS3, the portable set PS will now change to the next frequency $f_n$ (FIG. 5, signal (d)) in the prearranged frequency hopping sequence and a similar transaction will be executed at frequency $f_n$. For the present example, the portable sets PS will each have a time period that spans five slots in which to change to the next frequency $f_n$. After undergoing a transaction at $f_n$, the portable set PS will change to the next frequency $f_{n+1}$ and execute another transaction, and so forth.

The timing sequence for the transceiver T is shown in FIG. 5, signals (e)-(f). With respect to FIG. 5, signal (e), the receivers 125, 126 in transceiver T will each receive at frequency $f_{n-1}$ for a time period spanning INBOUND SLOTS IS1-IS6 and the CONTROL portion of the MIDAMBLE. At the end of the receive period, the receivers 125 and 126 of transceiver T will each be re-tuned by controller 158 to the next frequency $f_n$ in the hopping sequence. The receivers 125, 126 will remain tuned at $f_n$ for the next six slots IS1-IS6 and MIDAMBLE, and so forth. The transmitter 139 in transceiver T is first tuned to frequency $f_{n-1}$ (FIG. 5, signal (f)) where it will transmit a MIDAMBLE and six consecutive bit streams during slots OS1-OS6 (separated by five, one-bit GUARD times and one, seven-bit GUARD time). The transmitter 139 will then be re-tuned by interface 135 to the next frequency $f_n$ in the hopping sequence during the time period spanning the six INBOUND SLOTS IS1-IS6. The transmitter 39 will then transmit a MIDAMBLE and six 59-bit segments during the next six slots OS1-OS6 at the new frequency $f_n$, and then move to the next frequency $f_{n+1}$ in the hopping sequence to repeat the cycle.

Figure 6:
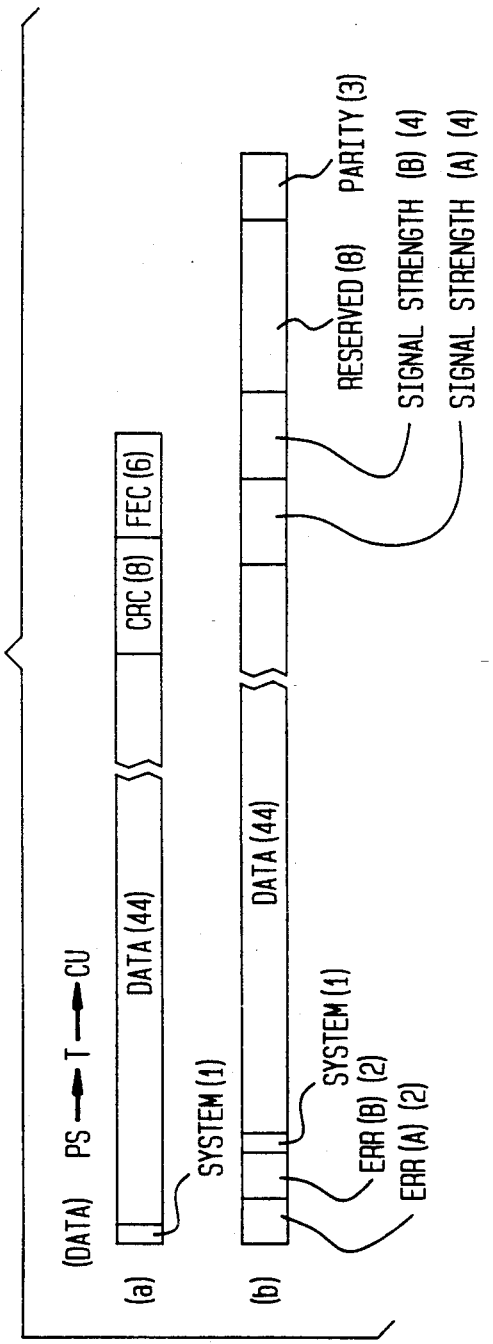

FIG. 6 illustrates a data transaction from a portable set PS to the control unit CU via a transceiver T. Information is inputted to the set PS via the microphone 166 or keyboard 167 or a computer terminal or other data source (not shown) to controller 158 (FIG. 3). The information source may be digital, or it may be analog in which case an A/D encoder, such as ADPCM encoder 171, would be required. Controller 158, using clock timing from clock 164, formats the digitized information into 59-bit frames including a 44-bit DATA field representative of the input information. A SYSTEM bit is applied at the front of the DATA field to indicate whether the 44-bit field is user data or system data. Next the CRC encoder 159 adds eight CRC bits and FEC encoder 161 adds six FEC bits to form the 59-bit transmission frame shown in FIG. 6, signal (a).

Under timing control from controller 158, the set PS will transmit this 59-bit frame during its proper slot IS1-IS6 via (FSK) modulator 162, FH transmitter 163, T/R 153 and antenna 152. The transceiver T will receive the 59-bit frame of FIG. 6, signal (a) and convert it into the 68-bit frame shown in FIG. 6, signal (b) for transmission to control unit CU.

The transceiver T receives the 59-bit frame (FIG. 6, signal (a)) via both antennas (A), (B) (FIG. 2). The received signals are passed by T/R switches 123, 124, detected by FH receivers 125, 126, demodulated by (FSK) demodulators 127, 128, error corrected by FEC decoders 131, 132 and CRC checked by CRC 133, 134. FEC decoders 131, 132 each have a first output for passing the digital signal to the inputs of CRC 133, 134, respectively, and a second output connected to interface 135. The second output from decoders 131, 132 transmits a logical signal to interface 135 that indicates whether or not the associated decoder 131, 132 detected and corrected an error. Likewise each CRC 133, 134 includes two outputs, one for passing the digital signal and the other for transmitting a logical signal to interface 135 that indicates whether or not the digital signals were properly error corrected in decoders 131, 132. For example, if a decoder 131, 132 indicates that no error was detected and, therefore, no correction was necessary, the interface 135 will receive, for example, a logical "0" from the associated decoder 131 or 132. However, because, the decoders 131, 132 can detect and correct only single errors, it has no way of knowing whether there was more than one error. Consequently, the logical outputs of CRC 133, 134 are used to indicate whether or not a decoder 131, 132 actually did provide an error-free output. Of course, if there was more than one error, decoder 131, 132 would have unsuccessfully tried to correct the errors in the digital signal and the output of the associated CRC 133, 134 would be, for example, a logical "0". On the other hand, if there was only one error, the proper decoders 131, 132 would correct the error and the associated CRC 133, 134 would have a logical output, e.g. logical "1", indicative of the correction.

In constructing the 68-bit signal of FIG. 6, signal (b), the interface 135 will generate two ERR signals each having two bits. Each 2-bit ERR signal is used to indicate one of the following concerning the signal received via each of the antennas (A), (B): there were no errors; there was one error that was corrected; there was more than one error. As such, the first 2-bit signal ERR(A) (FIG. 6, signal (b)) indicates the error condition of the 44-bit DATA plus the 8-bit CRC as received via antenna (A). The second 2-bit signal ERR(B) (FIG. 6, signal (b)) indicates the error condition of the same 44-bit DATA plus the 8-bit CRC as received via antenna (B). In constructing the 44-bit DATA in the signal of FIG. 6, signal (b), the logic of interface 135 uses the 44-bit DATA received with the least errors. If the number of errors in the received signals are the same for each antenna (A), (B) then interface 135 will choose either 44-bit DATA to construct the signal of FIG. 6, signal (b). However, if one antenna (A) or (B) received the DATA with no errors then that signal is used by interface 135 to construct FIG. 6, signal (b).

Next, the interface 135 adds two 4-bit codes, SIGNAL STRENGTH (A) and SIGNAL STRENGTH (B), in constructing the signal of FIG. 6, signal (b). These two, 4-bit codes are the result of the outputs of A/D 130, 140, respectively. Next, the interface 135 places eight arbitrary RESERVED bits in the signal of FIG. 6, signal (b). Finally, three PARITY bits are added to the signal of FIG. 6, signal (b) by interface 135.

The data transaction of FIG. 6 illustrates the logical process associated with a single HOP, the goal of which is primarily directed at transmitting the 44-bit DATA from a user at a portable set PS to some destination which may be another portable set PS or a user at a point on the telecommunications network 113. Besides receiving the 44-bit DATA via a transceiver T, the control unit CU also acquires information concerning which of the antennas (A) or (B) produced the best reception as indicated by ERR(A), ERR(B), SIGNAL STRENGTH(A) and SIGNAL STRENGTH(B). The control unit CU will use this information for "HAND OFF" via the MESSAGE section. The portable set PS, after transmitting the 59-bit signal (FIG. 6, signal (a)), remains tuned to the HOP frequency fn and keeps on its receiver 154 to receive the MIDAMBLE (at least the SYNC portion). It may transmit, using transmitter 163, during the CONTROL portion of the MIDAMBLE, if the set PS has a control action pending which requires action by unit CU. For example, a telephone handset user of a set PS may need a switch hook (FLASH) action to place a call on hold. This could be handled either via the CONTROL or by asserting the system bit and sending it in the slot IS3.

In addition to formatting ERR and SIGNAL STRENGTH signals, the interface 135 will operate the switch 141 to direct the output of transmitter 139 during an OUTBOUND SLOT, say slot OS3, to the antenna (A) or (B) that provided the best reception during the corresponding INBOUND SLOT, say slot IS3. In this manner, it is expected that transmissions to a set PS during a HOP will take place over the best path via the best antenna (A) or (B) as indicated by the received signal during that same HOP. FIG. 5, signal (g) illustrates a waveform outputted by interface 135 for operating switch 141. During the first HOP, antenna (A) is used during the OUTBOUND SLOTS OS2, OS4 and OS6. Antenna (B) is used during the slots OS1, OS3 and OS5. The MIDAMBLE is transmitted via antenna (B). In this HOP, either antenna (A) or (B) could be used to transmit the MIDAMBLE since the best reception by the six sets PS were evenly distributed between antennas (A) and (B). In the second HOP of FIG. 5, signal (g), four sets PS, the four assigned to INBOUND SLOTS IS1-IS4, had better reception on antenna (A) and the other two sets PS had better reception on antenna (B). As such, antenna (A) was used by transmitter 139 during the MIDAMBLE and the first four OUTBOUND SLOTS OS1-OS4. Antenna (B) is used during OUTBOUND SLOTS OS5–OS6. During the last HOP in FIG. 5, antenna (A) is used during the MIDAMBLE because signals from the majority of sets PS (five sets PS) were better received on antenna (A).

It may be desirable during one or more HOPS to have one portable set PS transmit the 56-bit CONTROL. Examples of situations wherein the portable set PS will need to use the 56-bit CONTROL include the following: the control unit CU sends a request for registration, or the PS needs to register a "do not disturb", or a request to redirect its calls to a "voice mailbox" answering machine. Examples of other functions include dynamic power control to adjust the effective cell coverage area, self test functions, etc.

FIG. 7, signal (a) shows the first portion of the MIDAMBLE including the 56-bit CONTROL followed by the 16-bit CRC and the GUARD times for twelve bit times. The 84-bit portion of the MIDAMBLE (FIG. 6a) would be transmitted by a particular set PS, received by transceiver T, reformatted into the 79-bit signal of FIG. 7, signal (b) by interface 135 for transmission to control unit CU. Immediately following the transmission of FIG. 7, signal (a), the transceiver T will switch to the appropriate antenna (A) or (B) and transmit the remaining 22-bit portion of the MIDAMBLE to include a 17-bit SYNC, a 2-bit MARK and a 3-bit ID (FIG. 4, signal (b)).

FIG. 8 illustrates a transaction initiated by the control unit CU and transmitted during an OUTBOUND SLOT, say slot OS3. The control unit CU primarily sends a 44-bit DATA for final consumption by a set PS. The 4-bit CR is used to control HOP sequence phase, plus other functions as may be determined in the future. HOP sequence phase control allows multiple transceivers T to operate in synchronism, but on different frequencies $f_k$ at all times, but always using frequencies $f_k$ from the set of 77. The 1-bit SYSTEM indicates whether the DATA is user or system data and the 3-bit PARITY is for error detection. In response to the 60-bit sequence of FIG. 8, signal (a), the transceiver T will transmit FIG. 8, signal (b) during the appropriate OUTBOUND SLOT, say slot OS3, for reception by the set PS assigned to the slot involved, e.g. the set PS assigned to slots IS3, OS3.

Figure 10:
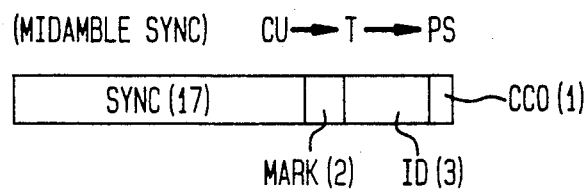

FIG. 9, signal (a) illustrates the 79-bit CONTROL portion (first portion) of the MIDAMBLE as generated by the control unit CU and sent to the transceiver T. The interface 135 will convert the 79-bit CONTROL portion to the first 84-bit portion of the MIDAMBLE (FIG. 9, signal (b)). The format of the SYNC portion (last portion) of the MIDAMBLE is shown in FIG. 10. This portion includes a 17-bit SYNC pattern that is repeated during each HOP for use by the sets PS to obtain synchronization with a transceiver T. The 2-bit MARK indicates six different positions in the hopping sequence at those times when the 2-bit MARK code changes. The 3-bit ID is used to identify the system.

The TABLES t1–t8 of the APPENDIX list the bit assignments and/or status of the control unit CU, the transceivers T and portable sets PS for a complete 880-bit HOP. It is understood that the bit times refer to the entire 880 bits of a single HOP for each of the elements, unit CU, transceiver T and sets PS. There will, of course, be a time delay between each of the elements. For example, although the control unit CU sends the 7-bit SYNC during bit times 491–507 (TABLE t1) and the transceiver T transmits this 7-bit SYNC also during bit times 491–507 as shown in TABLE T2, these two events do not occur simultaneously but rather with some time delay (in the order of a few bit times) as dictated by the particular elements used to implement the system 111.

Figure 12:
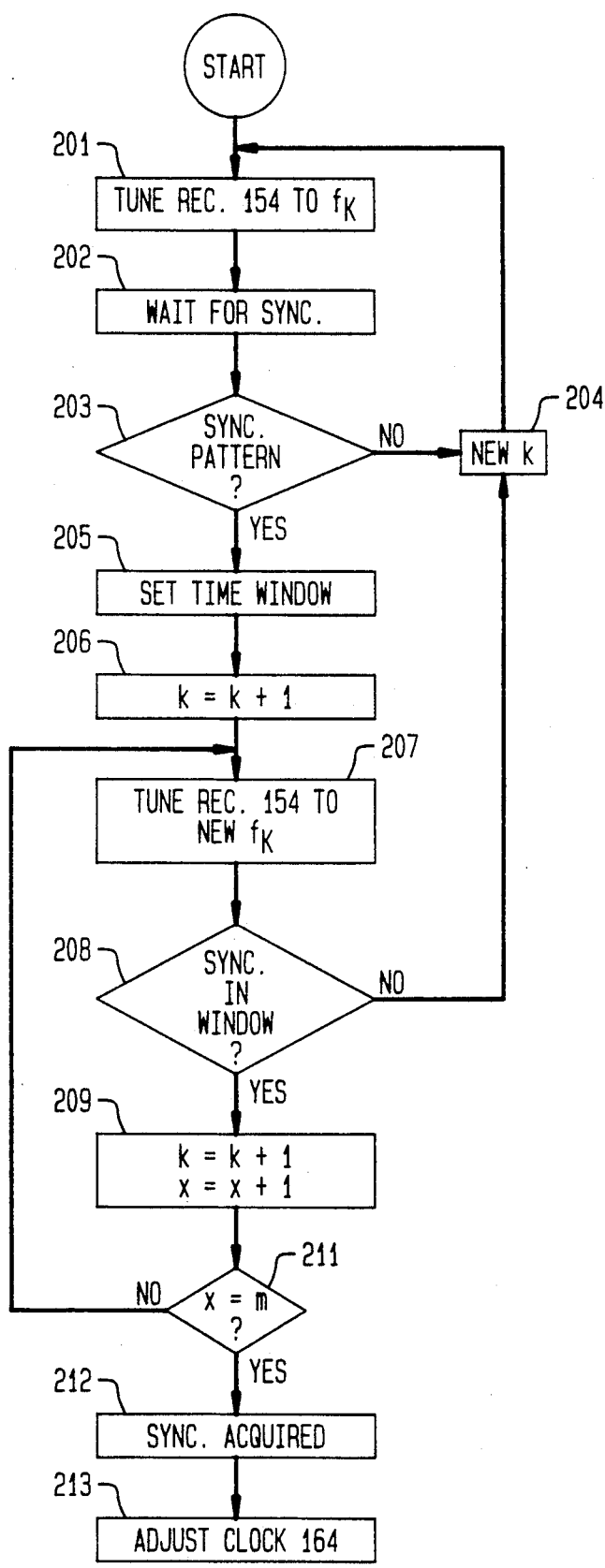
FIGS. 12 and 13 illustrate computer flow diagrams useful in understanding the preferred embodiment.
Figure 13:
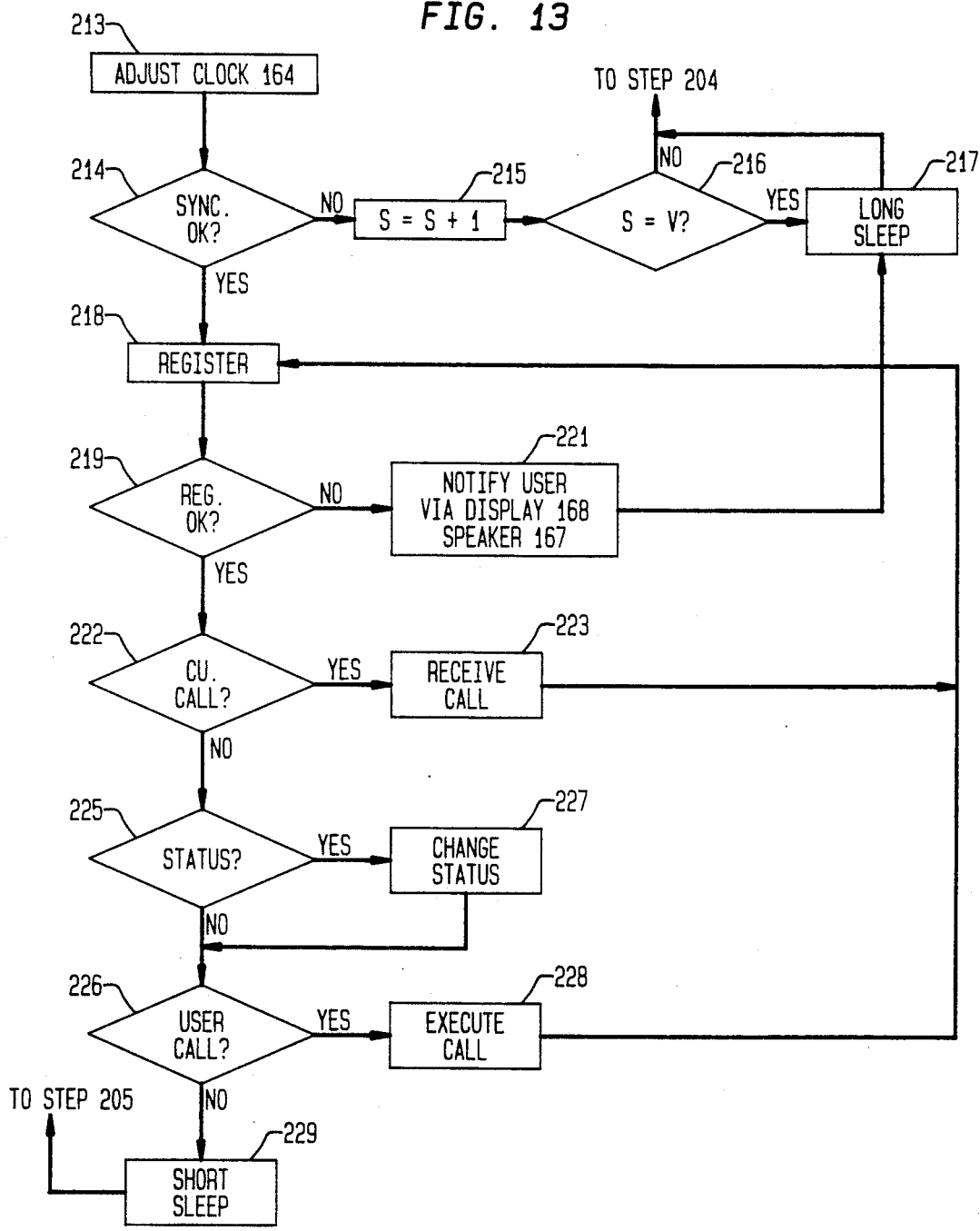

FIGS. 12 and 13 are computer flow diagrams depicting the operation of the portable sets PS, control unit CU and transceivers T. The controller 158 of sets PS and the interface 135 are best implemented by digital logic circuits including programmable microprocessors.

FIG. 12 illustrates the operation of a portable set PS starting at the instant the user energizes the set PS. The controller 158 (FIG. 3) is programmed to first obtain synchronization with a transceiver T and to then adjust its clock 164 to that of the control unit CU. Upon energization of the portable set PS by a user, the controller 158 will tune the FH receiver 154 to one of the hopping frequencies $f_k$ (step 201) (FIG. 12). The receiver 154 will remain tuned to frequency $f_k$ (step 202) for at least one hopping cycle (77 HOPS per cycle in the above example). During that period, the sync detector 165 will be looking at the received data to look for a match with the predetermined SYNC pattern (FIG. 10). If, after the hopping cycle is completed, no output signal from detector 165 has been received by controller 158, it will retune the receiver 154 to a new frequency (steps 204, 201). However, if a SYNC pattern is detected in step 203, the controller 158 will set a time window equal to one bit in width, one HOP after the SYNC detection (step 205), increment the value of $(k)$ by one unit (step 206), retune receiver 154 to the new frequency $f_k$ (step 207), and look for the SYNC pattern to be repeated at the proper time window in the next HOP (step 208) as detected by detector 165. If the proper SYNC pattern is not repeated by the transceiver T during the set time window (step 208), the controller 158 will choose a new value for $(k)$ (step 204), retune the receiver in step 201 and repeat the above cycle. However, if the SYNC pattern is repeated at the proper time in the next HOP (step 208), the controller 158 will receive a signal from detector 165 and respond by proceeding to step 209. The value of $(k)$ and a counting index (x) are each incremented by one unit (step 209). The counting index (x) is then compared to a predetermined value (M) (step 211). As such, after the controller 158 has hopped through (M) successive hopping frequencies and has detected the SYNC in the same window during each HOP, the controller 158 will assume that its set PS is synchronized with an appropriate transceiver T (step 212) and the clock 164 is adjusted (step 213) to track the timing of the SYNC pattern.

The next series of steps, diagrammed in FIG. 13, involves registration of a portable set PS with the control unit CU and the execution of calls. After the clock 164 is adjusted (step 213) the SYNC is again checked (step 214) to insure that the clock adjustment did not cause a loss of the SYNC. If the SYNC is lost in step 214, an index (s) is incremented (step 215), compared to a value (v) (step 216) and synchronization is again attempted by returning to step 204 (FIG. 12). When, however, a sufficient member of cycles has been performed such that (s) equals (v) (step 216), the set PS goes into a long sleep (step 217) wherein the set PS simply remains dormant for a predetermined, relatively long time after which synchronization is again attempted by returning to step 204 (FIG. 12).

After synchronization is acquired in step 214, the set PS will then register with the control unit CU by sending a registration code (step 218) via CONTROL (FIG.

7). The control unit CU will respond in a later HOP via CONTROL (FIG. 9) by transmitting an acknowledgement code which indicates to the set PS whether or not the registration is acceptable (step 219). If registration was not acceptable, the user is notified via display 168 and/or speaker 167 (step 221) and the set PS again is put into a long sleep (step 217).

If registration is acceptable, the controller 158 will then check the signals received or internally generated on the next HOP to determine whether or not a call is to be executed. The portable set PS may also notify the user via the display 168 and/or the speaker 167. If a call is to be executed, the set PS will either execute a user call via steps 222, 225, 226 and 228 or receive a call from the unit CU via steps 222 and 223. Before determining whether or not a user call is to be executed (step 226), the set PS will query the CONTROL to determine if a change in status of the set PS is being ordered by the unit CU (step 225). After a change in status is made (step 227), the set PS proceeds into step 226. If no user call is to be conducted (step 228), the portable set PS will enter a short sleep 229 via steps 222, 225 and 226 wherein the set PS terminates communication for a predetermined short time period after which the synchronization of clock 164, which has been freely running through the short sleep, will be checked for synchronization by returning to step 205 (FIG. 12). The short sleep 229 is primarily provided to reduce the drain on the battery which powers the set PS thereby increasing battery life. As such, the set PS, when lying dormant in its cradle, for example, will periodically fluctuate between being in a short sleep (step 229), wherein battery energy is conserved, and stepping through a cycle which includes acquiring SYNC (step 212), adjusting clock 164 (step 213), registering with unit CU (step 218) and checking to see if there is a call or a status change (steps 222, 225, 226). When entering the short sleep (step 229), the indices (s) and (x) are initialized.

After executing a user call (step 228), the set PS will register by returning to step 218. If it is determined (step 226), by reception of a call-alerting message addressed to the set PS in the CONTROL registration reply via CONTROL, that the unit CU has a call for the set PS, the set PS responds with an acknowledgement which it transmits via the CONTROL on a later HOP. Normally, the unit CU will then assign the set PS to a slot on a transceiver T, and communicate this assignment to the set PS via the CONTROL to the transceiver T to which the set PS is registered. It is noted that the transceiver T to which the set PS is assigned for communication is not required to be the one to which it is registered, but would depend upon the availability of system resources. The set PS will respond with an acknowledgement via CONTROL and then change frequency for communication with the newly assigned transceiver T (set PS changes transceivers by changing its HOP sequence timing to match the sequence of the assigned transceiver T). Upon changing to the assigned slot, the set PS would exchange confirmation with the unit CU that it had successfully changed, using the SYSTEM bit and the 44 bit DATA field, as shown in FIG. 4. The user call would then be executed.

If no call actions are required, the unit CU may need to change a status indicator in the set PS, such as a line busy/line available indicator. At step 225, the set PS checks the registration reply message received in the CONTROL for such indication, and carries out the appropriate action (step 227). The set PS then checks for a user call (step 226).

Figure 14:
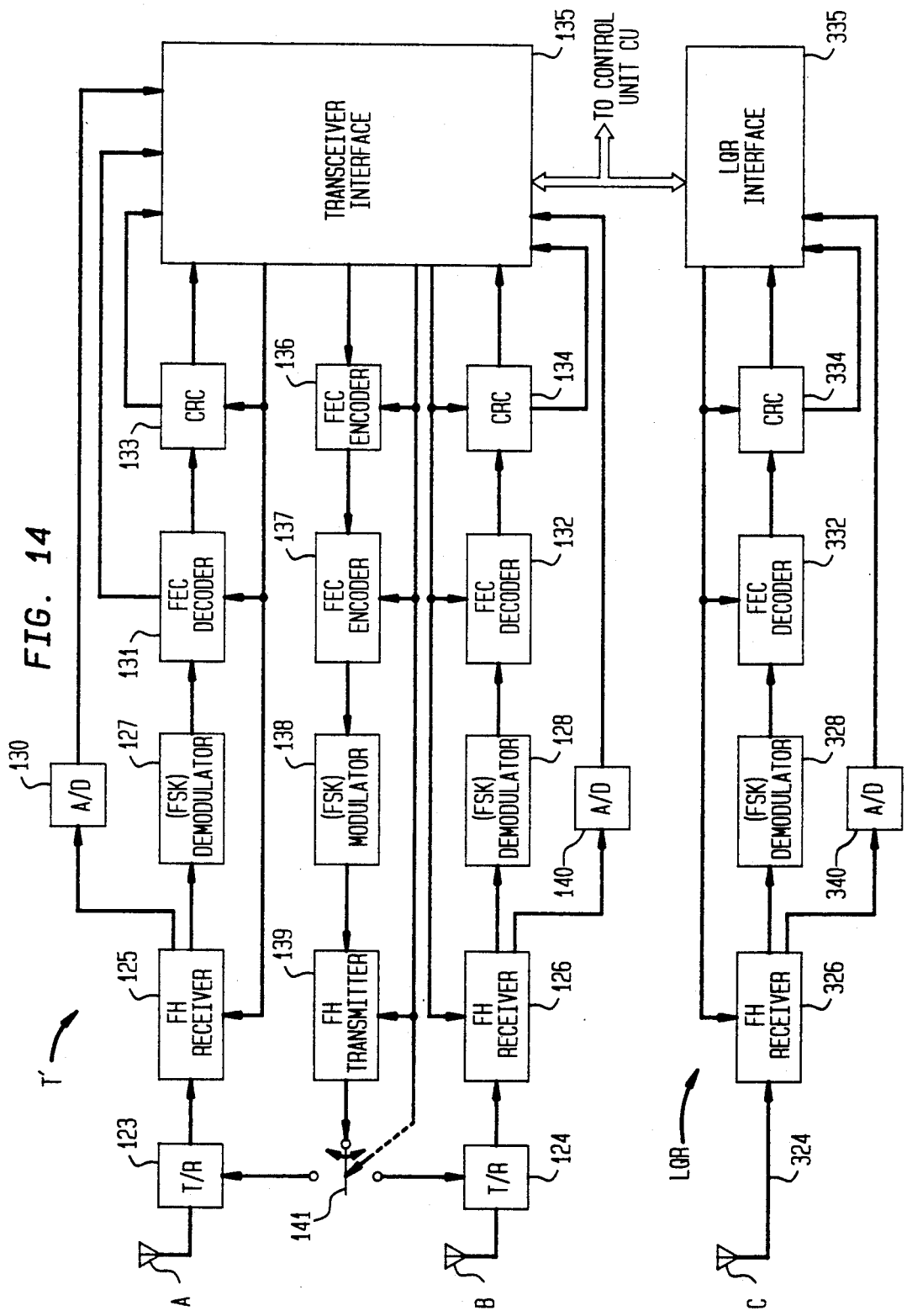
FIG. 14 is a detailed block diagram of a modification of the system shown in FIG. 2.

FIG. 14 illustrates a modified transceiver T' that includes all of the elements of transceiver T (FIG. 2) plus a link quality receiver LQR. Receiver LQR includes an LQR interface 335 having two-way wire communication with the unit CU, a logic input from CRC 334, an input from A/D 340, and control outputs to an FH receiver 326, an FEC decoder 332, and the CRC 334. An antenna C is connected to an input of FH receiver 326 whose output is first demodulated by (FSK) demodulator 328 and then decoded by FEC decoder 332. Encoder A/D 340 quantizes the signal strength of the output of receiver 326 and transmits a digital code to LQR interface 335 indicative of signal strength in the same manner as A/D's 130 and 140 quantize signal strength from FH receivers 125, 126.

The output from CRC 334 provides a logic signal to LQR interface 335 in the same manner as do the CRC's 133 and 134 provide logic signals to transceiver interface 135. Specifically, the logical output signal from CRC 334 provides a signal similar to the ERR (A) and ERR (B) signals. The logic signal from CRC 334 is indicative of the number of errors appearing in the signals received via antenna C.

Figure 15:
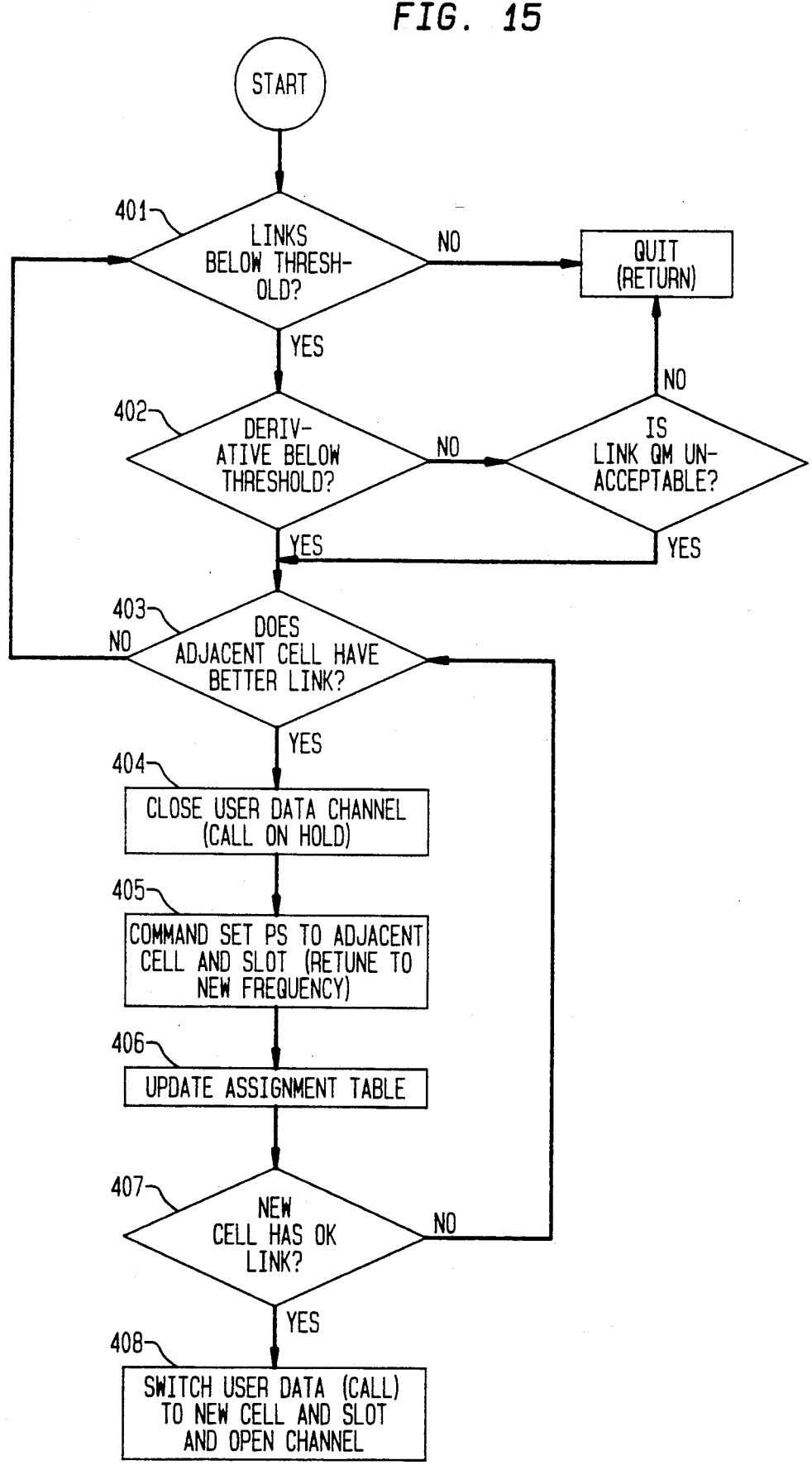
FIG. 15 illustrates a computer flow diagram useful in understanding the preferred embodiment.

As such, receiver LQR provides information to unit CU concerning the quality of the signals received via antenna C. This information on quality of reception is used by the unit CU to execute a handoff service as shown in FIG. 15. The handoff service is provided to permit the unit CU to hand off a set PS to a transceiver T', i.e. to automatically switch a set PS to a new transceiver T' to improve the reception of the sets PS when their reception has degraded.

Handoff starts when a link, i.e. a communications channel between a set PS and a transceiver T', has deteriorated below a predetermined threshold (step 401) and the rate of change of the deterioration is also below a threshold (step 402). The unit CU evaluates the degree of deterioration of the communication via the ERR (A), ERR (B), SIGNAL STRENGTH (A) and SIGNAL STRENGTH (B) signals (FIG. 6). If the values of these signals, as compared to some standard, show that the communications is poor (step 401) and that the derivative (rate of change) of these values show that the quality is not improving (step 402), then the unit CU will proceed with step 403 to determine if better reception at an adjacent transceiver T' is available. The unit CU accomplishes this (step 403) by tuning the FH receiver 326 of transceiver T' (FIG. 14) to the appropriate HOP frequency and sequence of transceiver T and then evaluates the reception at the new transceiver T' by comparing the signals outputted by A/D encoder 340 and CRC 334 to some standard. If transmission with the new link in the adjacent cell is not better, the unit CU returns to step 401 and the loop is repeated with another adjacent cell. If, however, the new link is found to provide acceptable communications as indicated by the reception via antenna C, the unit CU proceeds to step 404 wherein the call is momentarily put on hold while the set PS is instructed via DATA to retune FH receiver 154 and FH transmitter 163 to the appropriate HOP sequence (step 405). The unit CU will then (step 406) update an internal assignment table that lists the status and HOP sequence of each of the sets PS. Next (step 407), the unit CU evaluates the reception via antennas A and B and determines if the new link has acceptable reception. If not, the unit CU returns to step 403 and the loop is repeated. When an acceptable link is made, the unit CU enters step 408 and switches all appropriate calls to the new link.

Figure 16:
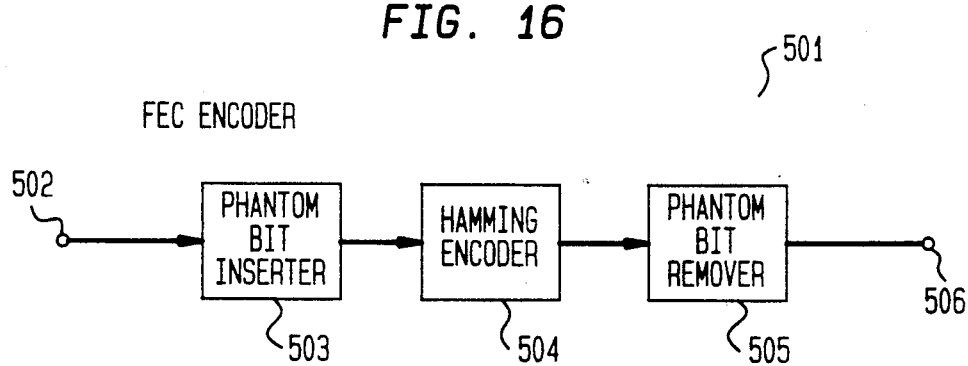
FIG. 16 is a block diagram of a portion of the preferred embodiment.

FIG. 16 is a block diagram of an FEC encoder 501 that employs phantom bit signalling. Encoder 501 may be used to implement the FEC encoders 137 (FIG. 2) and 161 (FIG. 3). The FEC encoder 501 has an input terminal 502 connected to the input of a phantom bit inserter 503 having an output that is connected to the input of a conventional Hamming encoder 504. The output of encoder 504 is connected to the input of a phantom bit remover 505 that has an output connected to terminal 506.

In general, the FEC encoder 501 operates to condition an incoming bit stream so it may be encoded by the Hamming encoder 504 and then conditions the encoded bit stream for transmission. Specifically, in the present invention, the typical input bit stream, to which an FEC code is to be applied, consists of 53 bits. FIG. 4, signal (c), FIG. 6, signal (a), and FIG. 8, signal (b), each show a signal made up of 53 bits to which six FEC check bits are to be appended. It is contemplated that the forward error correcting (FEC) code be a conventional (63, 57, 6) Hamming code. That is, each transmitted block is normally 63 bits long of which 57 are data bits and six are FEC check bits. In the construction of a code block for transmission in a conventional system, the 57 data bits are normally the first part of the block, and they are sent without modification, and the six FEC check bits are computed and then appended to the 57 data bits to produce a 63-bit block.

However, in the present invention, it is contemplated that only 59 bits be transmitted, rather than the full 63 bits, in each slot OS, IS so that there will be a sufficient number of bits available for the common signalling channel in the MIDAMBLE. To accomplish this, four phantom bits are first added to the 53 data bits to produce a 57-bit block, then the six FEC check bits are calculated (based on the 57 bits) and appended to the block to produce the 63-bit block, after which, the four phantom bits are removed to produce the final 59-bit block for transmission.

Figure 17:
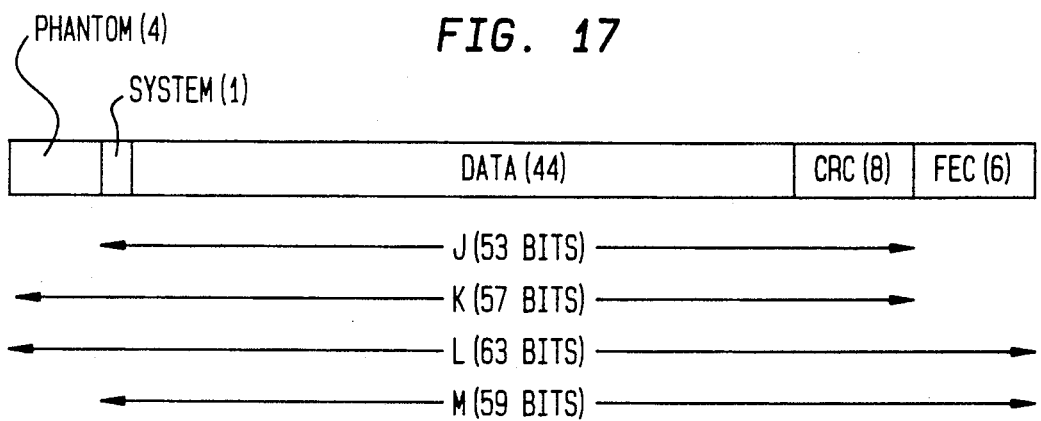
FIG. 17 is a graph representing a signal generated in the preferred embodiment.

More specifically, and with particular reference to FIGS. 16 and 17, the input terminal 502 presents the initial 53-bit block (J) of FIG. 17. For the FIG. 2 transmitter T, the output of the CRC encoder 136 would be connected to the terminal 502 and would produce the signal (J). The phantom bit inserter 503 would then insert a predetermined set of four bits to produce the 57-bit block (K) (FIG. 17). Using the 57-bit block (K), the conventional Hamming encoder 504 will calculate six FEC bits and append them to block (K) to produce block (L). The phantom bit remover 505 would then remove the four phantom bits to produce the 59-bit block (M).

Figure 18:
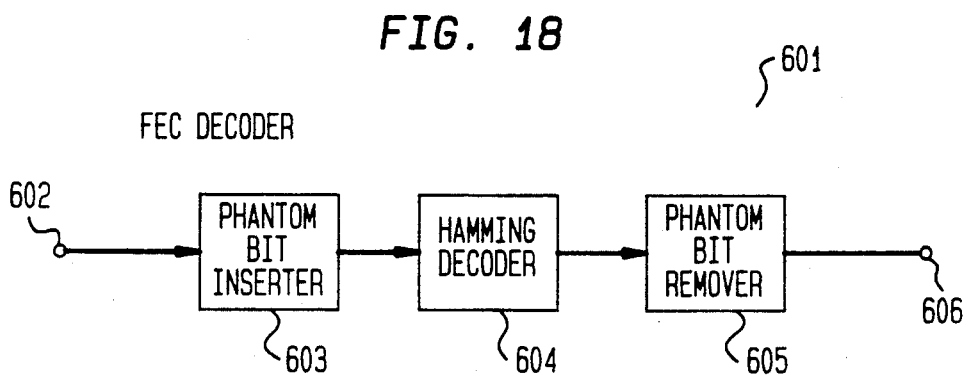
FIG. 18 is a block diagram of a portion of the preferred embodiment.

The transmitted block (M) is decoded using a similar operation to that just described for encoding. FIG. 18 illustrates a preferred FEC decoder 601 that may be employed to implement the decoders 131, 132 and 156. The transmitted block (M) is fed to phantom bit inserter 603 via input terminal 602. Inserter 603 will append four phantom bits to produce the 63-bit block (L). Next, the Hamming decoder, using the full 63-bit block (L), will calculate the proper six FEC check bits and perform forward error correction. The six FEC check bits are removed and the correct 57-bit block (K) is fed to phantom bit remover 605. The four phantom bits are removed and the 53-bit block (J) is fed to terminal 606.

Of course, the four phantom bits must be common for a given link, since a receiver using the wrong combination of phantom bits may not be capable of decoding the information being transmitted. Precisely, if a 4-bit sequence used at one end of a link differs from that at the other end of the link by more than one bit, then the decoder 601 will fail, as a conventional (63, 57, 6) Hamming code can only correct one error. As such, the four-bit phantom code can be used as a link continuity check to prevent packets from one system 111 from crossing over into another system, independently of the system number check in the MIDAMBLE.

More importantly, it can be used to prevent call packets in one cell, say cell C1, of a system 111 from being accepted in another cell, say cell C2, of the same system 111, if for some reason the cells were set up in such a way that the two cells were operating on the same sequence and were close enough that signals from a portable set PS of one cell could propagate into the other. Ideally, a system 111 should not be set so that crossover can happen, but propagation in buildings is often hard to predict and installers might not foresee all the potentials for such undesired propagation. Since the four phantom bits are never really transmitted, the encoding is called "phantom bit signalling".

It is apparent that, by requiring a difference of two phantom bits between different codes, there are only eight different codes available with 4 bits each. If more codes are required, phantom bits can be concatenated from packet to packet. However, if this is done, there will be a possibility of a packet crossing over occasionally, albeit before the violation is probably detected. If, for example, two, 4-bit codes are concatenated, then there is a chance of two systems 111 having the same first four bits but different second four bits. This gives a selection of 256 different phantom codes. The phantom bit signalling would most likely be used in a manner similar to the "SAT color" analog tone used in the U.S. standard analog cellular systems as a validator of call continuity. Only three SAT colors are used in analog cellular, so the provision of eight "colors" with no need to add bits is a potentially valuable addition to the art.

This phantom bit signalling can also be used beneficially in lower complexity systems which may realize only portions of the system 111 disclosed herein. Such reduced systems may trade off some of the features for reduced cost and complexity. In such a system, the system code might be omitted in favor of using only the phantom bit signalling. In addition, this method of signalling can be used to reduce the cost and complexity of complying with new FCC regulations requiring cordless telephones to use a digital code verification before dialing to prevent false dialling or access to a base unit other than the intended one.

Various other modifications are contemplated and may obviously be resorted to by those skilled in the art without departing from the spirit and scope of the invention. For example, in the preferred embodiment, handoff involves the periodic evaluation by the unit CU of the quality of transmissions taking place between the sets PS and the transceivers T. If the transmission quality deteriorates, an automatic handoff is performed by the unit CU. As an alternative, handoff may also be initiated by other sources. A user-initiated handoff feature may be provided wherein the user at the handsets H1, H2 or the data terminals D1, D2 may initiate such handoff by sending an appropriate signal to the unit CU. Still further, handoff may be initiated by the unit CU in response to existing traffic patterns, as opposed to or in addition to signal deterioration, to prevent anticipated traffic overloads.

It is also noted that in some installations, the unit CU may not be able to find a transceiver T having sufficient transmission quality to effect an appropriate handoff. In some cases, provision may be readily made wherein the unit CU will put the call on temporary hold and signal the set PS that handoff was not possible. For example, a red light on the set PS may be energized to inform the user that in his present location handoff to another transceiver T having better transmission quality is not possible. In response, the user could physically move to another location at which time handoff would again be attempted.

Still further, those skilled in these arts will also appreciate the extent to which the registration function may be used to control access to a particular system 111. The registration function may include the use of special codes that limit particular users to only certain types of calls. For example, a user at one location may take his handset H1 to another location at which a similar system 111 is employed. It may be desirable to permit the user, when visiting the other location, to make one kind of call (e.g. local calls) and not make other calls (e.g. long distance calls). Restriction of the user to the local calls only may be provided via the registration function.

Additionally, the registration function may also be used to provide a credit card feature. For example, a user's credit card information may be incorporated into the registration data. As such, credit card calls may be automatically made at a user's home location or when visiting a location having a compatible system 111.

It is therefore to be understood, that within the scope of the appended claims, the invention may be practiced otherwise than as specifically described, as only preferred embodiments thereof have been disclosed.

APPENDIX

Tables t1-t8 list the status of an element (e.g. unit CU is idle during bit times 0-490 in Table t1) or the bit assignments for the bits generated, transmitted or received by an element for a HOP. Each HOP involves 880 bit times.

Table t1: This table lists the 880 bit assignments for those bits generated by the unit CU for transmission to a transceiver T for a single HOP and wherein one of the portable sets PS will transmit the CONTROL portion of the MIDAMBLE for that HOP. The status of the unit CU is given for those bit times when a bit is not being generated by unit CU.

| BIT TIME | BIT ASSIGNMENT/STATUS CONTROL UNIT CU TO TRANSCEIVER T |
|---|---|
| 0 | IDLE |
| . | . |
| 490 | IDLE |
| 491 | SYNC 0 |
| 492 | SYNC 1 |
| . | . |
| 507 | SYNC 16 |
| 508 | MARK 0 |
| 509 | MARK 1 |
| 510 | ID 0 |
| 511 | ID 1 |
| 512 | ID 2 |
| 513 | CONTROL OWNER |
| 514 | CR 0 |
| 515 | CR 1 |
| 516 | CR 2 |
| 517 | CR 3 |
| 518 | SYSTEM |
| 519 | DATA 0 |
| 520 | DATA 1 |
| . | . |
| 562 | DATA 43 |
| 563 | RESERVED 0 |
| 564 | RESERVED 1 |
| . | . |
| 570 | RESERVED 7 |
| 571 | PARITY 0 |
| 572 | PARITY 1 |
| 573 | PARITY 2 |
| 574 | CR 0 |
| 575 | CR 1 |
| 576 | CR 2 |
| 577 | CR 3 |
| 578 | SYSTEM |
| 579 | DATA 0 |
| 580 | DATA 1 |
| . | . |
| 622 | DATA 43 |
| 623 | RESERVED 0 |
| 624 | RESERVED 1 |
| . | . |
| 630 | RESERVED 7 |
| 631 | PARITY 0 |
| 632 | PARITY 1 |
| 633 | PARITY 2 |
| 634 | CR 0 |
| 635 | CR 1 |
| 636 | CR 2 |
| 637 | CR 3 |
| 638 | SYSTEM |
| 639 | DATA 0 |
| 649 | DATA 1 |
| . | . |
| 682 | DATA 43 |
| 683 | RESERVED 0 |
| 684 | RESERVED 1 |
| . | . |
| 690 | RESERVED 7 |
| 691 | PARITY 0 |
| 692 | PARITY 1 |
| 693 | PARITY 2 |
| 694 | CR 0 |
| 695 | CR 1 |
| 696 | CR 2 |
| 697 | CR 3 |
| 698 | SYSTEM |
| 699 | DATA 0 |
| 700 | DATA 1 |
| . | . |
| 742 | DATA 43 |
| 743 | RESERVED 0 |
| 744 | RESERVED 1 |
| . | . |
| 750 | RESERVED 7 |
| 751 | PARITY 0 |
| 752 | PARITY 1 |
| 753 | PARITY 2 |
| 754 | CR 0 |
| 755 | CR 1 |
| 756 | CR 2 |
| 757 | CR 3 |
| 758 | SYSTEM |
| 759 | DATA 0 |
| 760 | DATA 1 |
| . | . |
| 802 | DATA 43 |

| BIT TIME | BIT ASSIGNMENT/STATUS CONTROL UNIT CU TO TRANSCEIVER T |
|---|---|
| 803 | RESERVED 0 |
| 804 | RESERVED 1 |
| . | . |
| . | . |
| 810 | RESERVED 7 |
| 811 | PARITY 0 |
| 812 | PARITY 1 |
| 813 | PARITY 2 |
| 814 | CR 0 |
| 815 | CR 1 |
| 816 | CR 2 |
| 817 | CR 3 |
| 818 | SYSTEM |
| 819 | DATA 0 |
| 820 | DATA 1 |
| . | . |
| . | . |
| 862 | DATA 43 |
| 863 | RESERVED 0 |
| 864 | RESERVED 1 |
| . | . |
| . | . |
| 870 | RESERVED 7 |
| 871 | PARITY 0 |
| 872 | PARITY 1 |
| 873 | PARITY 2 |
| 874 | IDLE |
| 875 | IDLE |
| 876 | IDLE |
| 877 | IDLE |
| 878 | IDLE |
| 879 | IDLE |

Table t2: This Table lists the bit assignments for the 880 bit times for those bits generated and received by a transceiver T in response to the HOP of Table t1. These 880 bits are transmitted to up to six portable sets PS.

| BIT TIME | | BIT ASSIGNMENTS/ STATUS TRANSCEIVER T TO PORTABLE SETS PS |
|---|---|---|
| 0 | (RECEIVERS 125,126) | RECEIVE SYSTEM |
| . | | . |
| 490 | (RECEIVERS 125,126) | GUARD |
| 491 | (TRANSMITTER 139) | SYNC 0 |
| 492 | . | SYNC 1 |
| . | . | . |
| 507 | . | SYNC 16 |
| 508 | . | MARK 0 |
| 509 | . | MARK 1 |
| 510 | . | ID 0 |
| 511 | . | ID 1 |
| 512 | . | ID 2 |
| 513 | . | CONTROL OWNER |
| 514 | . | SYSTEM |
| 515 | . | DATA 0 |
| 516 | . | DATA 1 |
| . | . | . |
| 558 | . | DATA 43 |
| 559 | . | CRC 0 |
| 560 | . | CRC 1 |
| . | . | . |
| 566 | . | CRC 7 |
| 567 | . | FEC 0 |
| 568 | . | FEC 1 |
| . | . | . |
| 572 | . | FEC 5 |
| 573 | . | GUARD |
| 574 | . | SYSTEM |
| 575 | . | DATA 0 |
| 576 | . | DATA 1 |
| . | . | . |
| 618 | . | DATA 43 |
| 619 | . | CRC 0 |
| 620 | . | CRC 1 |
| . | . | . |
| 626 | . | CRC 7 |
| 627 | . | FEC 0 |
| 628 | . | FEC 1 |
| . | . | . |
| 632 | . | FEC 5 |
| 633 | . | GUARD |
| 634 | . | SYSTEM |
| 635 | . | DATA 0 |
| 636 | . | DATA 1 |
| . | . | . |
| 678 | . | DATA 43 |
| 679 | . | CRC 0 |
| 680 | . | CRC 1 |
| . | . | . |
| 686 | . | CRC 7 |
| 687 | . | FEC 0 |
| 688 | . | FEC 1 |
| . | . | . |
| 692 | . | FEC 5 |
| 693 | . | GUARD |
| 694 | . | SYSTEM |
| 695 | . | DATA 0 |
| 696 | . | DATA 1 |
| . | . | . |
| 738 | . | DATA 43 |
| 739 | . | CRC 0 |
| 740 | . | CRC 1 |
| . | . | . |
| 746 | . | CRC 7 |
| 747 | . | FEC 0 |
| 748 | . | FEC 1 |
| . | . | . |
| 752 | . | FEC 5 |
| 753 | . | GUARD |
| 754 | . | SYSTEM |
| 755 | . | DATA 0 |
| 756 | . | DATA 1 |
| . | . | . |
| 798 | . | DATA 43 |
| 799 | . | CRC 0 |
| 800 | . | CRC 1 |
| . | . | . |
| 806 | . | CRC 7 |
| 807 | . | FEC 0 |
| 808 | . | FEC 1 |
| . | . | . |
| 812 | . | FEC 5 |
| 813 | . | GUARD |
| 814 | . | SYSTEM |
| 815 | . | DATA 0 |
| 816 | . | DATA 1 |
| . | . | . |
| 858 | . | DATA 43 |
| 859 | . | CRC 0 |
| 860 | . | CRC 1 |
| . | . | . |
| 866 | . | CRC 7 |
| 867 | . | FEC 0 |

-continued

| BIT TIME | | BIT ASSIGNMENTS/STATUS TRANSCEIVER T TO PORTABLE SETS PS |
|---|---|---|
| 868 | . | FEC 1 |
| . | . | . |
| 872 | (TRANSMITTER 139) | FEC 5 |
| 873 | . | GUARD |
| 874 | . | GUARD |
| . | . | . |
| 879 | . | GUARD |

Table t3: This table lists the bit assignment and status for a portable set PS that is synchronized to communicate with a transceiver T in the INBOUND IS3 and the OUTBOUND SLOT OS3. The CONTROL is being transmitted by the portable set PS.

| BIT TIME | | BIT ASSIGNMENTS/STATUS PORTABLE SET PS TO TRANSCEIVER T PS ASSIGNED SLOTS IS3, OS3 |
|---|---|---|
| 0 | . | CHANGE FREQUENCY |
| . | | . |
| 135 | . | CHANGE FREQUENCY |
| 136 | (TRANSMITTER 163) | SYSTEM |
| 137 | . | DATA 0 |
| 138 | . | DATA 1 |
| . | . | . |
| 180 | . | DATA 43 |
| 181 | . | CRC 0 |
| 182 | . | CRC 1 |
| . | . | . |
| 188 | . | CRC 7 |
| 189 | . | FEC 0 |
| 190 | . | FEC 1 |
| . | . | . |
| 194 | (TRANSMITTER 163) | FEC 5 |
| 195 | . | GUARD |
| . | . | . |
| 203 | . | GUARD |
| 204 | (RECEIVER 154) | RECEIVE |
| . | . | . |
| 407 | (RECEIVER 154) | RECEIVE |
| 408 | (TRANSMITTER 163) | CONTROL 0 |
| 409 | . | CONTROL 1 |
| . | . | . |
| 463 | . | CONTROL 55 |
| 464 | . | CRC 0 |
| 465 | . | CRC 1 |
| . | . | . |
| 479 | (TRANSMITTER 163) | CRC 15 |
| 480 | . | GUARD |
| . | . | . |
| 490 | . | GUARD |
| 491 | (RECEIVER 154) | RECEIVE SYNC 0 |
| 492 | . | RECEIVE SYNC 1 |
| . | . | . |
| 507 | . | RECEIVE SYNC 16 |
| 508 | . | RECEIVE MARK 0 |
| 509 | . | RECEIVE MARK 1 |
| 510 | . | RECEIVE ID 0 |
| 511 | . | RECEIVE ID 1 |
| 512 | . | RECEIVE ID 2 |

-continued

| BIT TIME | | BIT ASSIGNMENTS/STATUS PORTABLE SET PS TO TRANSCEIVER T PS ASSIGNED SLOTS IS3, OS3 |
|---|---|---|
| 513 | . | RECEIVE CONTROL OWNER |
| . | . | . |
| 634 | . | RECEIVE SYSTEM |
| 635 | . | RECEIVE DATA 0 |
| 636 | . | RECEIVE DATA 1 |
| . | . | . |
| 678 | . | RECEIVE DATA 43 |
| 679 | . | RECEIVE CRC 0 |
| 680 | . | RECEIVE CRC 1 |
| . | . | . |
| 686 | . | RECEIVE CRC 7 |
| 687 | . | RECEIVE FEC 0 |
| 688 | . | RECEIVE FEC 1 |
| . | . | . |
| 692 | (RECEIVER 154) | RECEIVE FEC 5 |
| 693 | . | IDLE |
| 694 | . | CHANGE FREQUENCY |
| . | | . |
| 879 | . | CHANGE FREQUENCY |

Table t4: This Table lists bit assignments for the 880 bits formatted by the transceiver T in response to receptions during a HOP from six portable sets PS with a CONTROL transmitted from one portable set PS. This 880 bit sequence is transmitted to unit CU.

| BIT TIME | BIT ASSIGNMENTS/STATUS TRANSCEIVER T TO CONTROL UNIT CU |
|---|---|
| 0 | ERR(A)0 |
| 1 | ERR(A)1 |
| 2 | ERR(B)0 |
| 3 | ERR(B)1 |
| 4 | SYSTEM |
| 5 | DATA 0 |
| 6 | DATA 1 |
| . | . |
| 48 | DATA 43 |
| 49 | SIGNAL STRENGTH(A)0 |
| 50 | SIGNAL STRENGTH(A)1 |
| 51 | SIGNAL STRENGTH(A)2 |
| 52 | SIGNAL STRENGTH(A)3 |
| 53 | SIGNAL STRENGTH(B)0 |
| 54 | SIGNAL STRENGTH(B)1 |
| 55 | SIGNAL STRENGTH(B)2 |
| 56 | SIGNAL STRENGTH(B)3 |
| 57 | RESERVED 0 |
| 58 | RESERVED 1 |
| . | . |
| 64 | RESERVED 7 |
| 65 | PARITY |
| 66 | PARITY |
| 67 | PARITY |
| 68 | ERR(A)0 |
| 69 | ERR(A)1 |
| 70 | ERR(B)0 |
| 71 | ERR(B)1 |
| 72 | SYSTEM |
| 73 | DATA 0 |
| 74 | DATA 1 |
| . | . |
| 116 | DATA 43 |
| 117 | SIGNAL STRENGTH(A)0 |
| 118 | SIGNAL STRENGTH(A)1 |

| BIT TIME | BIT ASSIGNMENTS/STATUS TRANSCEIVER T TO CONTROL UNIT CU |
|---|---|
| 119 | SIGNAL STRENGTH(A)2 |
| 120 | SIGNAL STRENGTH(A)3 |
| 121 | SIGNAL STRENGTH(B)0 |
| 122 | SIGNAL STRENGTH(B)1 |
| 123 | SIGNAL STRENGTH(B)2 |
| 124 | SIGNAL STRENGTH(B)3 |
| 125 | RESERVED 0 |
| 126 | RESERVED 1 |
| . | . |
| 132 | RESERVED 7 |
| 133 | PARITY |
| 134 | PARITY |
| 135 | PARITY |
| 136 | ERR(A)0 |
| 137 | ERR(A)1 |
| 138 | ERR(B)0 |
| 139 | ERR(B)1 |
| 140 | SYSTEM |
| 141 | DATA 0 |
| 142 | DATA 1 |
| . | . |
| 184 | DATA 43 |
| 185 | SIGNAL STRENGTH(A)0 |
| 186 | SIGNAL STRENGTH(A)1 |
| 187 | SIGNAL STRENGTH(A)2 |
| 188 | SIGNAL STRENGTH(A)3 |
| 189 | SIGNAL STRENGTH(B)0 |
| 190 | SIGNAL STRENGTH(B)1 |
| 191 | SIGNAL STRENGTH(B)2 |
| 192 | SIGNAL STRENGTH(B)3 |
| 193 | RESERVED 0 |
| 194 | RESERVED 1 |
| . | . |
| 200 | RESERVED 7 |
| 201 | PARITY |
| 202 | PARITY |
| 203 | PARITY |
| 204 | ERR(A)0 |
| 205 | ERR(A)1 |
| 206 | ERR(B)0 |
| 207 | ERR(B)1 |
| 208 | SYSTEM |
| 209 | DATA 0 |
| 210 | DATA 1 |
| . | . |
| 252 | DATA 43 |
| 253 | SIGNAL STRENGTH(A)0 |
| 254 | SIGNAL STRENGTH(A)1 |
| 255 | SIGNAL STRENGTH(A)2 |
| 256 | SIGNAL STRENGTH(A)3 |
| 257 | SIGNAL STRENGTH(B)0 |
| 258 | SIGNAL STRENGTH(B)1 |
| 259 | SIGNAL STRENGTH(B)2 |
| 260 | SIGNAL STRENGTH(B)3 |
| 261 | RESERVED 0 |
| 262 | RESERVED 1 |
| . | . |
| 268 | RESERVED 7 |
| 269 | PARITY |
| 270 | PARITY |
| 271 | PARITY |
| 272 | ERR(A)0 |
| 273 | ERR(A)1 |
| 274 | ERR(B)0 |
| 275 | ERR(B)1 |
| 276 | SYSTEM |
| 277 | DATA 0 |
| 278 | DATA 1 |
| . | . |
| 320 | DATA 43 |
| 321 | SIGNAL STRENGTH(A)0 |
| 322 | SIGNAL STRENGTH(A)1 |
| 323 | SIGNAL STRENGTH(A)2 |
| 324 | SIGNAL STRENGTH(A)3 |
| 325 | SIGNAL STRENGTH(B)0 |
| 326 | SIGNAL STRENGTH(B)1 |
| 327 | SIGNAL STRENGTH(B)2 |
| 328 | SIGNAL STRENGTH(B)3 |
| 329 | RESERVED 0 |
| 330 | RESERVED 1 |
| . | . |
| 336 | RESERVED 7 |
| 337 | PARITY |
| 338 | PARITY |
| 339 | PARITY |
| 340 | ERR(A)0 |
| 341 | ERR(A)1 |
| 342 | ERR(B)0 |
| 343 | ERR(B)1 |
| 344 | SYSTEM |
| 345 | DATA 0 |
| 346 | DATA 1 |
| . | . |
| 388 | DATA 43 |
| 389 | SIGNAL STRENGTH(A)0 |
| 390 | SIGNAL STRENGTH(A)1 |
| 391 | SIGNAL STRENGTH(A)2 |
| 392 | SIGNAL STRENGTH(A)3 |
| 393 | SIGNAL STRENGTH(B)0 |
| 394 | SIGNAL STRENGTH(B)1 |
| 395 | SIGNAL STRENGTH(B)2 |
| 396 | SIGNAL STRENGTH(B)3 |
| 397 | RESERVED 0 |
| 398 | RESERVED 1 |
| . | . |
| 404 | RESERVED 7 |
| 405 | PARITY |
| 406 | PARITY |
| 407 | PARITY |
| 408 | ERR(A)0 |
| 409 | ERR(A)1 |
| 410 | ERR(B)0 |
| 411 | ERR(B)1 |
| 412 | CONTROL 0 |
| 413 | CONTROL 1 |
| . | . |
| 467 | CONTROL 55 |
| 468 | SIGNAL STRENGTH(A)0 |
| 469 | SIGNAL STRENGTH(A)1 |
| 470 | SIGNAL STRENGTH(A)2 |
| 471 | SIGNAL STRENGTH(A)3 |
| 472 | SIGNAL STRENGTH(B)0 |
| 473 | SIGNAL STRENGTH(B)1 |
| 474 | SIGNAL STRENGTH(B)2 |
| 475 | SIGNAL STRENGTH(B)3 |
| 476 | T/CU |
| 477 | T/CU |
| . | . |
| 483 | T/CU |
| 484 | PARITY 0 |
| 485 | PARITY 1 |
| 486 | PARITY 2 |
| 487 | IDLE |
| . | . |
| 866 | IDLE |
| 867 | RANGE WINDOW |
| . | . |
| 877 | RANGE WINDOW |
| 878 | ZERO |
| 879 | SYNC BIT |

Table t5: This Table, similar to Table t1, lists the bit assignments for the 880 bits constructed by the unit CU for the case in which the CONTROL is generated by the unit CU.

| BIT TIME | BIT ASSIGNMENTS/STATUS CONTROL UNIT CU TO TRANSCEIVER T |
| --- | --- |
| 0 | IDLE |
| . | . |
| . | . |
| 407 | IDLE |
| 408 | CR 0 |
| 409 | CR 1 |
| 410 | CR 2 |
| 411 | CR 3 |
| 412 | CONTROL 0 |
| 413 | CONTROL 1 |
| . | . |
| . | . |
| 467 | CONTROL 55 |
| 468 | T/CU |
| 469 | T/CU |
| . | . |
| . | . |
| 475 | T/CU |
| 476 | RESERVED 0 |
| 477 | RESERVED 1 |
| . | . |
| . | . |
| 483 | RESERVED 7 |
| 484 | PARITY |
| 485 | PARITY |
| 486 | PARITY |
| 487 | IDLE |
| . | . |
| . | . |
| 490 | IDLE |
| 491 | SYNC 0 |
| 492 | SYNC 1 |
| . | . |
| . | . |
| 507 | SYNC 16 |
| 508 | MARK 0 |
| 509 | MARK 1 |
| 510 | ID |
| 511 | ID |
| 512 | ID |
| 513 | CONTROL OWNER |
| 514 | CR 0 |
| 515 | CR 1 |
| 516 | CR 2 |
| 517 | CR 3 |
| 518 | SYSTEM |
| 519 | DATA 0 |
| 520 | DATA 1 |
| . | . |
| . | . |
| 562 | DATA 43 |
| 563 | RESERVED 0 |
| 564 | RESERVED 1 |
| . | . |
| . | . |
| 570 | RESERVED 7 |
| 571 | PARITY |
| 572 | PARITY |
| 573 | PARITY |
| 574 | CR 0 |
| 575 | CR 1 |
| 576 | CR 2 |
| 577 | CR 3 |
| 578 | SYSTEM |
| 579 | DATA 0 |
| 580 | DATA 1 |
| . | . |
| . | . |
| 622 | DATA 43 |
| 623 | RESERVED 0 |
| 624 | RESERVED 1 |
| . | . |
| . | . |
| 630 | RESERVED 7 |
| 631 | PARITY 0 |
| 632 | PARITY 1 |
| 633 | PARITY 2 |
| 634 | CR 0 |
| 635 | CR 1 |
| 636 | CR 2 |
| 637 | CR 3 |
| 638 | SYSTEM |
| 639 | DATA 0 |
| 640 | DATA 1 |
| . | . |
| . | . |
| 682 | DATA 43 |
| 683 | RESERVED 0 |
| 684 | RESERVED 1 |
| . | . |
| . | . |
| 690 | RESERVED 7 |
| 691 | PARITY 0 |
| 692 | PARITY 1 |
| 693 | PARITY 2 |
| 694 | CR 0 |
| 695 | CR 1 |
| 696 | CR 2 |
| 697 | CR 3 |
| 698 | SYSTEM |
| 699 | DATA 0 |
| 700 | DATA 1 |
| . | . |
| . | . |
| 742 | DATA 43 |
| 743 | RESERVED 0 |
| 744 | RESERVED 1 |
| . | . |
| . | . |
| 750 | RESERVED 7 |
| 751 | PARITY 0 |
| 752 | PARITY 1 |
| 753 | PARITY 2 |
| 754 | CR 0 |
| 755 | CR 1 |
| 756 | CR 2 |
| 757 | CR 3 |
| 758 | SYSTEM |
| 759 | DATA 0 |
| 760 | DATA 1 |
| . | . |
| . | . |
| 802 | DATA 43 |
| 803 | RESERVED 0 |
| 804 | RESERVED 1 |
| . | . |
| . | . |
| 810 | RESERVED 7 |
| 811 | PARITY 0 |
| 812 | PARITY 1 |
| 813 | PARITY 2 |
| 814 | CR 0 |
| 815 | CR 1 |
| 816 | CR 2 |
| 817 | CR 3 |
| 818 | SYSTEM |
| 819 | DATA 0 |
| 820 | DATA 1 |
| . | . |
| . | . |
| 862 | DATA 43 |
| 863 | RESERVED 0 |
| 864 | RESERVED 1 |
| . | . |
| . | . |
| 870 | RESERVED 7 |
| 871 | PARITY 0 |
| 872 | PARITY 1 |
| 873 | PARITY 2 |
| 874 | IDLE |
| 875 | IDLE |
| 876 | IDLE |
| 877 | IDLE |
| 878 | IDLE |
| 879 | IDLE |

Table t6: This Table lists the bit assignments generated and transmitted by a transceiver T in response to receiving the bits in the 880 bit times listed in Table t5.

| BIT TIME | | BIT ASSIGNMENTS/STATUS TRANSCEIVER T TO PORTABLE SET PS |
|---|---|---|
| 0 | (RECEIVERS 125,126) | RECEIVE |
| . | | . |
| . | | . |
| . | | . |
| 407 | (RECEIVERS 125,126) | RECEIVE |
| 408 | (TRANSMITTER 139) | CONTROL 0 |
| 409 | | CONTROL 1 |
| . | | . |
| . | | . |
| . | | . |
| 463 | | CONTROL 55 |
| 464 | | CRC 0 |
| 465 | | CRC 1 |
| . | | . |
| . | | . |
| . | | . |
| 479 | | CRC 15 |
| 480 | | GUARD |
| . | | . |
| . | | . |
| . | | . |
| 490 | | GUARD |
| 491 | | SYNC 0 |
| 492 | | SYNC 1 |
| . | | . |
| . | | . |
| . | | . |
| 507 | | SYNC 16 |
| 508 | | MARK 0 |
| 509 | | MARK 1 |
| 510 | | ID 0 |
| 511 | | ID 1 |
| 512 | | ID 2 |
| 513 | | CONTROL OWNER |
| 514 | | SYSTEM |
| 515 | | DATA 0 |
| 516 | | DATA 1 |
| . | | . |
| . | | . |
| . | | . |
| 558 | | DATA 43 |
| 559 | | CRC 0 |
| 560 | | CRC 1 |
| . | | . |
| . | | . |
| . | | . |
| 566 | | CRC 7 |
| 567 | | FEC 0 |
| 568 | | FEC 1 |
| . | | . |
| . | | . |
| . | | . |
| 572 | | FEC 5 |
| 573 | | GUARD |
| 574 | | SYSTEM |
| 575 | | DATA 0 |
| 576 | | DATA 1 |
| . | | . |
| . | | . |
| . | | . |
| 618 | | DATA 43 |
| 619 | | CRC 0 |
| 620 | | CRC 1 |
| . | | . |
| . | | . |
| . | | . |
| 626 | | CRC 7 |
| 627 | | FEC 0 |
| 628 | | FEC 1 |
| . | | . |
| . | | . |
| . | | . |
| 632 | | FEC 5 |
| 633 | | GUARD |
| 634 | | SYSTEM |
| 635 | | DATA 0 |
| 636 | | DATA 1 |
| . | | . |
| . | | . |
| . | | . |
| 678 | | DATA 43 |
| 679 | | CRC 0 |
| 680 | | CRC 1 |
| . | | . |
| . | | . |
| . | | . |
| 686 | | CRC 7 |
| 687 | | FEC 0 |
| 688 | | FEC 1 |
| . | | . |
| . | | . |
| . | | . |
| 692 | | FEC 5 |
| 693 | | GUARD |
| 694 | | SYSTEM |
| 695 | | DATA 0 |
| 696 | | DATA 1 |
| . | | . |
| . | | . |
| . | | . |
| 738 | | DATA 43 |
| 739 | | CRC 0 |
| 740 | | CRC 1 |
| . | | . |
| . | | . |
| . | | . |
| 746 | | CRC 7 |
| 747 | | FEC 0 |
| 748 | | FEC 1 |
| . | | . |
| . | | . |
| . | | . |
| 752 | | FEC 5 |
| 753 | | GUARD |
| 754 | | SYSTEM |
| 755 | | DATA 0 |
| 756 | | DATA 1 |
| . | | . |
| . | | . |
| . | | . |
| 798 | | DATA 43 |
| 799 | | CRC 0 |
| 800 | | CRC 1 |
| . | | . |
| . | | . |
| . | | . |
| 806 | | CRC 7 |
| 807 | | FEC 0 |
| 808 | | FEC 1 |
| . | | . |
| . | | . |
| . | | . |
| 812 | | FEC 5 |
| 813 | | GUARD |
| 814 | | SYSTEM |
| 815 | | DATA 0 |
| 816 | | DATA 1 |
| . | | . |
| . | | . |
| . | | . |
| 858 | | DATA 43 |
| 859 | | CRC 0 |
| 860 | | CRC 1 |
| . | | . |
| . | | . |
| . | | . |
| 866 | | CRC 7 |
| 867 | | FEC 0 |
| 868 | | FEC 1 |
| . | | . |
| . | | . |
| . | | . |
| 872 | (TRANSMITTER 139) | FEC 5 |
| 873 | | GUARD |
| 874 | | GUARD |
| . | | . |
| . | | . |
| . | | . |
| 879 | | GUARD |

Table t7: This table, similar to Table t3, lists the bit assignments for a portable set PS communicating with a transceiver T during INBOUND SLOT IS3 and OUTBOUND SLOT OS3. The CONTROL in this HOP is not being generated by this portable set PS.

| BIT TIME | | BIT ASSIGNMENTS STATUS PORTABLE SET PS ASSIGNED SLOTS IS3, OS3 |
|---|---|---|
| 0 | | CHANGE FREQUENCY |
| . | | . |
| . | | . |
| . | | . |
| 135 | | CHANGE FREQUENCY |
| 136 | (TRANSMITTER 163) | SYSTEM |

-continued

| BIT TIME | | BIT ASSIGNMENTS STATUS PORTABLE SET PS ASSIGNED SLOTS IS3. OS3 |
|---|---|---|
| 137 | . | DATA 0 |
| 138 | . | DATA 1 |
| . | . | . |
| 180 | . | DATA 43 |
| 181 | . | CRC 0 |
| 182 | . | CRC 1 |
| . | . | . |
| 188 | . | CRC 7 |
| 189 | . | FEC 0 |
| 190 | . | FEC 1 |
| . | . | . |
| 194 | (TRANSMITTER 163) | FEC 5 |
| 195 | | GUARD |
| . | | . |
| 203 | | GUARD |
| 204 | (RECEIVER 154) | RECEIVE |
| . | | . |
| 408 | | RECEIVE CONTROL 0 |
| 409 | | RECEIVE CONTROL 1 |
| . | . | . |
| 463 | . | RECEIVE CONTROL 55 |
| 464 | . | RECEIVE CRC 0 |
| 465 | . | RECEIVE CRC 1 |
| . | . | . |
| 479 | . | RECEIVE CRC 15 |
| 480 | . | GUARD |
| . | | . |
| 490 | . | GUARD |
| 491 | . | RECEIVE SYNC 0 |
| 492 | . | RECEIVE SYNC 1 |
| . | . | . |
| 507 | . | RECEIVE SYNC 16 |
| 508 | . | RECEIVE MARK 0 |
| 509 | . | RECEIVE MARK 1 |
| 510 | . | RECEIVE ID 0 |
| 511 | . | RECEIVE ID 1 |
| 512 | . | RECEIVE ID 2 |
| 513 | . | RECEIVE CONTROL OWNER |
| . | | . |
| 634 | . | RECEIVE SYSTEM |
| 635 | . | RECEIVE DATA 0 |
| 636 | . | RECEIVE DATA 1 |
| . | | . |
| 678 | . | RECEIVE DATA 43 |
| 679 | . | RECEIVE CRC 0 |
| 680 | . | RECEIVE CRC 1 |
| . | . | . |
| 686 | . | RECEIVE CRC 7 |
| 687 | . | RECEIVE FEC 0 |
| 688 | . | RECEIVE FEC 1 |
| . | . | . |
| 692 | (RECEIVER 154) | RECEIVE FEC 5 |
| 693 | | IDLE |
| 694 | | CHANGE FREQUENCY |
| . | | . |
| 879 | | CHANGE FREQUENCY |

Table t8: This Table lists the bits constructed for a HOP by transceiver T in response to receiving DATA from six portable sets PS none of which transmitted the CONTROL. These bits are transmitted to unit CU.

| BIT TIME | BIT ASSIGNMENTS/STATUS TRANSCEIVER T TO CONTROL UNIT CU |
|---|---|
| 0 | ERR(A)0 |
| 1 | ERR(A)1 |
| 2 | ERR(B)0 |
| 3 | ERR(B)1 |
| 4 | SYSTEM |
| 5 | DATA 0 |
| 6 | DATA 1 |
| . | . |
| 48 | DATA 43 |
| 49 | SIGNAL STRENGTH(A)0 |
| 50 | SIGNAL STRENGTH(A)1 |
| 51 | SIGNAL STRENGTH(A)2 |
| 52 | SIGNAL STRENGTH(A)3 |
| 53 | SIGNAL STRENGTH(B)0 |
| 54 | SIGNAL STRENGTH(B)1 |
| 55 | SIGNAL STRENGTH(B)2 |
| 56 | SIGNAL STRENGTH(B)3 |
| 57 | RESERVED 0 |
| 58 | RESERVED 1 |
| . | . |
| 64 | RESERVED 7 |
| 65 | PARITY |
| 66 | PARITY |
| 67 | PARITY |
| 68 | ERR(A)0 |
| 69 | ERR(A)1 |
| 70 | ERR(B)0 |
| 71 | ERR(B)1 |
| 72 | SYSTEM |
| 73 | DATA 0 |
| 74 | DATA 1 |
| . | . |
| 116 | DATA 43 |
| 117 | SIGNAL STRENGTH(A)0 |
| 118 | SIGNAL STRENGTH(A)1 |
| 119 | SIGNAL STRENGTH(A)2 |
| 120 | SIGNAL STRENGTH(A)3 |
| 121 | SIGNAL STRENGTH(B)0 |
| 122 | SIGNAL STRENGTH(B)1 |
| 123 | SIGNAL STRENGTH(B)2 |
| 124 | SIGNAL STRENGTH(B)3 |
| 125 | RESERVED 0 |
| 126 | RESERVED 1 |
| . | . |
| 132 | RESERVED 7 |
| 133 | PARITY |
| 134 | PARITY |
| 135 | PARITY |
| 136 | ERR(A)0 |
| 137 | ERR(A)1 |
| 138 | ERR(B)0 |
| 139 | ERR(B)1 |
| 140 | SYSTEM |
| 141 | DATA 0 |
| 142 | DATA 1 |
| . | . |
| 184 | DATA 43 |
| 185 | SIGNAL STRENGTH(A)0 |
| 186 | SIGNAL STRENGTH(A)1 |
| 187 | SIGNAL STRENGTH(A)2 |
| 188 | SIGNAL STRENGTH(A)3 |
| 189 | SIGNAL STRENGTH(B)0 |
| 190 | SIGNAL STRENGTH(B)1 |
| 191 | SIGNAL STRENGTH(B)2 |
| 192 | SIGNAL STRENGTH(B)3 |
| 193 | RESERVED 0 |
| 194 | RESERVED 1 |
| . | . |
| 200 | RESERVED 7 |
| 201 | PARITY |
| 202 | PARITY |

-continued

| BIT TIME | BIT ASSIGNMENTS/STATUS TRANSCEIVER T TO CONTROL UNIT CU |
|---|---|
| 203 | PARITY |
| 204 | ERR(A)0 |
| 205 | ERR(A)1 |
| 206 | ERR(B)0 |
| 207 | ERR(B)1 |
| 208 | SYSTEM |
| 209 | DATA 0 |
| 210 | DATA 1 |
| . | . |
| 252 | DATA 43 |
| 253 | SIGNAL STRENGTH(A)0 |
| 254 | SIGNAL STRENGTH(A)1 |
| 255 | SIGNAL STRENGTH(A)2 |
| 256 | SIGNAL STRENGTH(A)3 |
| 257 | SIGNAL STRENGTH(B)0 |
| 258 | SIGNAL STRENGTH(B)1 |
| 259 | SIGNAL STRENGTH(B)2 |
| 260 | SIGNAL STRENGTH(B)3 |
| 261 | RESERVED 0 |
| 262 | RESERVED 1 |
| . | . |
| 268 | RESERVED 7 |
| 269 | PARITY |
| 270 | PARITY |
| 271 | PARITY |
| 272 | ERR(A)0 |
| 273 | ERR(A)1 |
| 274 | ERR(B)0 |
| 275 | ERR(B)1 |
| 276 | SYSTEM |
| 277 | DATA 0 |
| 278 | DATA 1 |
| . | . |
| 320 | DATA 43 |
| 321 | SIGNAL STRENGTH(A)0 |
| 322 | SIGNAL STRENGTH(A)1 |
| 323 | SIGNAL STRENGTH(A)2 |
| 324 | SIGNAL STRENGTH(A)3 |
| 325 | SIGNAL STRENGTH(B)0 |
| 326 | SIGNAL STRENGTH(B)1 |
| 327 | SIGNAL STRENGTH(B)2 |
| 328 | SIGNAL STRENGTH(B)3 |
| 329 | RESERVED 0 |
| 330 | RESERVED 1 |
| . | . |
| 336 | RESERVED 7 |
| 337 | PARITY |
| 338 | PARITY |
| 339 | PARITY |
| 340 | ERR(A)0 |
| 341 | ERR(A)1 |
| 342 | ERR(B)0 |
| 343 | ERR(B)1 |
| 344 | SYSTEM |
| 345 | DATA 0 |
| 346 | DATA 1 |
| . | . |
| 388 | DATA 43 |
| 389 | SIGNAL STRENGTH(A)0 |
| 390 | SIGNAL STRENGTH(A)1 |
| 391 | SIGNAL STRENGTH(A)2 |
| 392 | SIGNAL STRENGTH(A)3 |
| 393 | SIGNAL STRENGTH(B)0 |
| 394 | SIGNAL STRENGTH(B)1 |
| 395 | SIGNAL STRENGTH(B)2 |
| 396 | SIGNAL STRENGTH(B)3 |
| 397 | RESERVED 0 |
| 398 | RESERVED 1 |
| . | . |
| 404 | RESERVED 7 |
| 405 | PARITY |
| 406 | PARITY |
| 407 | PARITY |
| 408 | IDLE |

-continued

| BIT TIME | BIT ASSIGNMENTS/STATUS TRANSCEIVER T TO CONTROL UNIT CU |
|---|---|
| . | . |
| 866 | IDLE |
| 867 | RANGE WINDOW |
| . | . |
| 877 | RANGE WINDOW |
| 878 | ZERO |
| 879 | SYNC BIT |

What is claimed is:

1. A wireless communication system comprising:
a base network control means for receiving calls from and forwarding calls to an external communications network, and for generating a frequency hopping signal;
a plurality of portable radio sets each having a frequency hopping transmitter and a frequency hopping receiver; and
a plurality of fixed radio ports mounted at spaced locations to define a plurality of cells, each said port connected to said base network control means, and each said port including a digital transceiver means for transmitting and receiving frequency hopping radio signals for communicating with said portable sets and wherein said frequency hopping signal for each hop includes a first set of adjacent data receiving slots, a second set of adjacent data transmitting slots and a midamble slot placed between said first and second set of slots.

2. The system of claim 1 wherein each of said portable radio sets includes timing means for transmitting and receiving data during a different one of said slots.

3. The system of claim 2 wherein said fixed radio ports hop through the same hopping sequence but at different phases in said sequence.

4. The system of claim 3 wherein said portable radio sets include means for hopping at the same phase as the fixed radio port located in the same cell therewith.

5. The system of claim 4 wherein said fixed radio ports each include a forward error correction (FEC) encoder means for adding an FEC code to signals transmitted in each of said slots.

6. The system of claim 5 wherein each said portable set includes an FEC decoder means for error detecting and correcting received signals.

7. The system of claim 6 wherein each said portable set includes an FEC encoder means for adding an FEC code to signals transmitted by said set.

8. The system of claim 7 wherein said FEC encoder means and FEC decoder means each include a phantom bit signalling means for appending phantom bits to said signals prior to FEC encoding and decoding, and for removing said phantom bits after FEC encoding and decoding.

9. The system of claim 7 wherein each said fixed radio port and said portable sets include a cyclic redundancy check (CRC) encoder means for encoding a redundancy error checking code to transmitted signals.

10. The system of claim 9 wherein each of said fixed radio ports and said portable sets includes a CRC decoder means for detecting errors in said received signals.

11. The system of claim 4 further including an antenna diversity means for selectively receiving and transmitting signals via one of a plurality of spaced antennas depending on the quality of reception thereby.

12. The system of claim 4 wherein each of said fixed radio ports includes antenna diversity means for selectively receiving and transmitting signals via one of at least two spaced antennas depending on the quality of reception thereby.

13. The system cf claim 12 wherein at least one of said portable sets is a hand-held audio transmitter and receiver.

14. The system of claim 13 wherein at least one of said sets includes audio input and output devices and pulse code modulation devices connected thereto.

15. The system of claim 14 wherein at least one of said sets includes a display output device and a keyboard connected thereto.

16. The system of claim 12 wherein at least one of said portable sets is a data terminal device.

17. The system of claim 12 wherein said portable sets include synchronous means for detecting signals received during said midamble and for adjusting a clock means upon detection of said synchronizing signals.

18. The system of claim 17 wherein said portable set includes a long sleep means for causing said set to remain dormant for a predetermined period of time if said synchronous means fails to detect a synchronizing signal after a substantially predetermined number of clock cycles.

19. The system of claim 17 wherein at least one of said fixed ports includes a link quality receiver means for receiving signals at the phase of an adjacent cell to determine the quality of reception from a portable set in said adjacent cell.

20. The system of claim 19 wherein said base network control means includes means for handing off said portable radio sets from one cell to another cell having a higher quality of reception as determined by said link quality receiver means.

* * * * *